US011862103B2

(12) United States Patent
Tamura et al.

(10) Patent No.: US 11,862,103 B2
(45) Date of Patent: Jan. 2, 2024

(54) ELECTRO-OPTICAL DEVICE AND ELECTRONIC APPARATUS

(71) Applicant: SEIKO EPSON CORPORATION, Tokyo (JP)

(72) Inventors: Tsuyoshi Tamura, Suwa-gun (JP); Kazuo Nishizawa, Matsumoto (JP); Robina Atsuchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/946,732

(22) Filed: Sep. 16, 2022

(65) Prior Publication Data

US 2023/0098172 A1 Mar. 30, 2023

(30) Foreign Application Priority Data

Sep. 17, 2021 (JP) ................................ 2021-152339

(51) Int. Cl.
*G09G 3/32* (2016.01)
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0847* (2013.01); *G09G 2310/0286* (2013.01); *G09G 2340/0435* (2013.01)

(58) Field of Classification Search
CPC .......... G09G 3/3266; G09G 3/32; G09G 3/34; G09G 3/36; G09G 3/3233; G09G 2300/0819; G09G 2300/0847; G09G 2310/0286; G09G 2340/0435
See application file for complete search history.

(56) References Cited

U.S. PATENT DOCUMENTS 7,522,145 B2 * 4/2009 Lee ...................... G11C 19/184 345/94
10,453,392 B2 * 10/2019 Xu ..................... H10K 59/1213
2004/0001159 A1 1/2004 Shen et al.
2006/0125807 A1 * 6/2006 Park ..................... G09G 3/3233 345/204
2012/0033039 A1 2/2012 Sasaki et al.
(Continued)

FOREIGN PATENT DOCUMENTS

JP 2005-531962 A 10/2005
JP WO2012/017643 A1 10/2013
(Continued)

*Primary Examiner* — Pegeman Karimi
(74) *Attorney, Agent, or Firm* — Oliff PLC

(57) ABSTRACT

In an electro-optical device, pixel circuits are provided corresponding to an intersection between a scanning line in an i-th row and a data line in a k-th column in a display region, and an intersection between a scanning line and data line. The pixel circuit is brought into an optical state in accordance with a voltage of a data line when a scanning line is selected. In an odd frame period, in the i-th row selection period and the (i+1)-th row, a data signal of a voltage corresponding to the i-th row and k-th column of data of the top image is output, and in an even frame period, in the i-th row selection period and the (i+1)-th row, a data signal of a voltage corresponding to the (i+1)-th row and the k-th column of data of the bottom image is output.

7 Claims, 24 Drawing Sheets

(56) References Cited

U.S. PATENT DOCUMENTS

| | | | | |
|---|---|---|---|---|
| 2013/0093653 | A1* | 4/2013 | Ota | G09G 3/2096<br>345/76 |
| 2015/0029083 | A1* | 1/2015 | He | G09G 3/3648<br>345/100 |
| 2015/0113572 | A1 | 4/2015 | Oyman | |
| 2018/0261161 | A1* | 9/2018 | Ota | H10K 50/81 |
| 2019/0005884 | A1 | 1/2019 | Yoo | |

FOREIGN PATENT DOCUMENTS

| | | | |
|---|---|---|---|
| JP | 2014-022908 | A | 2/2014 |
| JP | 2018-014746 | A | 1/2018 |
| JP | 2019-012258 | A | 1/2019 |
| JP | 2020-021083 | A | 2/2020 |

* cited by examiner

ELECTRO-OPTICAL DEVICE AND ELECTRONIC APPARATUS

The present application is based on, and claims priority from JP Application Serial Number 2021-152339, filed Sep. 17, 2021, the disclosure of which is hereby incorporated by reference herein in its entirety.

BACKGROUND

1. Technical Field

The present disclosure relates to an electro-optical device and an electronic apparatus.

2. Related Art

As a display element, for example, an electro-optical device in which an OLED is used has been known. OLED is an abbreviation for Organic Light Emitting Diode. In this electro-optical device, a pixel circuit including a transistor for causing current to flow through the display element, or the like is provided corresponding to each pixel of an image to be displayed. The transistor supplies a current in accordance with a brightness level to the display element. Accordingly, the display element emits light at brightness in accordance with the current. Video data expressing an image to be displayed in the electro-optical device is supplied from an upper-level host device.

In recent years, a delay time since a host device is supplied with video data until an image is actually displayed in an electro-optical device is becoming a problem. In order to reduce this delay time, for example, a technique described in JP 2020-21083 A has been known.

However, there is a problem that the technique described in JP 2020-21083 A requires two scanning lines per row (line), which complicates wiring in a display region in which pixel circuits are arrayed. Further, in the above technique, since a frame rate and resolution are in a trade-off relationship, there is also a problem that displaying at a high frame rate cannot be performed while maintaining resolution.

SUMMARY

An electro-optical device according to an aspect of the present disclosure includes a first scanning line disposed in an i-th row in a display region, a first pixel circuit provided corresponding to the first scanning line and a first data line provided in a k-th column in the display region, and configured to be brought into an optical state in accordance with a voltage of the first data line when the first scanning line is selected, a second scanning line disposed in an (i+1)-th row in the display region, and a second pixel circuit provided corresponding to the second scanning line and the first data line, and configured to be brought into an optical state in accordance with a voltage of the first data line when the second scanning line is selected, wherein i and k are integers, in a period in which the first scanning line and the second scanning line are selected, of a first subframe period of a frame period, a data signal of a voltage corresponding to an i-th row and a k-th column of first image data in the first subframe period is output, and in a period, in which the first scanning line and the second scanning line are selected, of a second subframe period of the frame period, a data signal of a voltage corresponding to an (i+1)-th row and the k-th column of second image data in the second subframe period is output.

BRIEF DESCRIPTION OF THE DRAWINGS

FIG. 25 is a diagram illustrating selection of scanning lines in the second exemplary embodiment, and the like.

FIG. 26 is a diagram illustrating selection of scanning lines in another drive, and the like.

DESCRIPTION OF EXEMPLARY EMBODIMENTS

An electro-optical device according to exemplary embodiments of the present disclosure will be described below with reference to the accompanying figures. Note that, in each figure, a size and a scale of each unit is different from the actual size and the actual scale of each unit as appropriate. Moreover, exemplary embodiments described below are suitable specific examples, and various technically preferable limitations are applied, but the scope of the disclosure is not limited to these modes unless it is specifically described in the following description to limit the disclosure.

First Exemplary Embodiment

Figure 1:
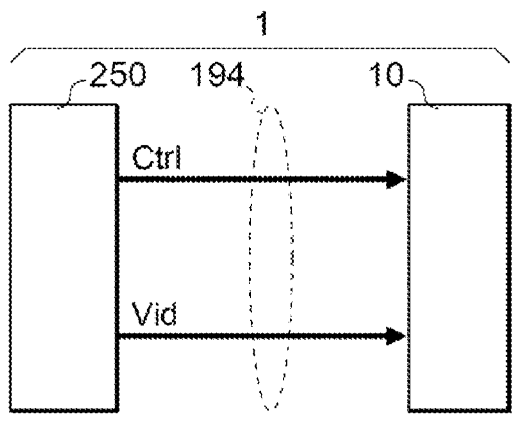
FIG. 1 is a diagram illustrating a configuration of a system including an electro-optical device according to a first exemplary embodiment.

FIG. 1 is a diagram illustrating a configuration of a system including an electro-optical device according to a first exemplary embodiment.

As illustrated in the figure, a system 1 includes a host device 250 and an electro-optical device 10. The host device 250 generates video data Vid in which images caused to be displayed by the electro-optical device 10 are continuous. The host device 250 supplies the generated video data Vid to the electro-optical device 10 together with a control signal Ctrl such as a synchronization signal via an FPC substrate 194. Note that FPC is an abbreviation for Flexible Printed Circuits. Note that, the control signal Ctrl includes a row address described below.

Figure 2:
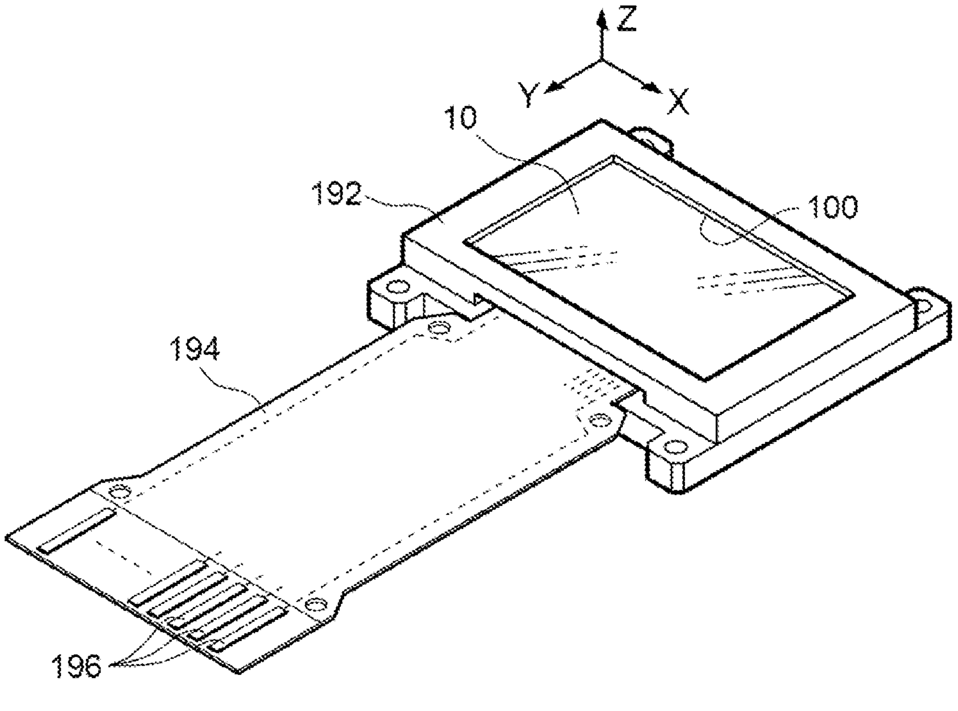
FIG. 2 is a perspective view illustrating an electro-optical device.

FIG. 2 is a perspective view illustrating a configuration of the electro-optical device 10. The electro-optical device 10 is a micro display panel configured to display a color image, for example, in a head-mounted display, and a plurality of pixel circuits, a driving circuit for driving the pixel circuit, and the like are formed at a semiconductor substrate. The semiconductor substrate is typically a silicon substrate, but other semiconductor substrates may be used.

The electro-optical device 10 is housed in a frame-shaped case 192 that opens in a display region 100, and one end of the FPC substrate 194 is coupled to the electro-optical device 10. Another end of the FPC substrate 194 is provided with a plurality of terminals 196 for coupling to the host device 250.

In the figure, an X direction indicates an extension direction of a scanning line in the electro-optical device 10, and a Y direction indicates an extension direction of a data line. A two-dimensional plane defined by the X direction and the Y direction is a substrate surface of the semiconductor substrate. A Z direction is perpendicular to the X direction and the Y direction, and indicates an emission direction of light emitted from a display element.

Figure 3:
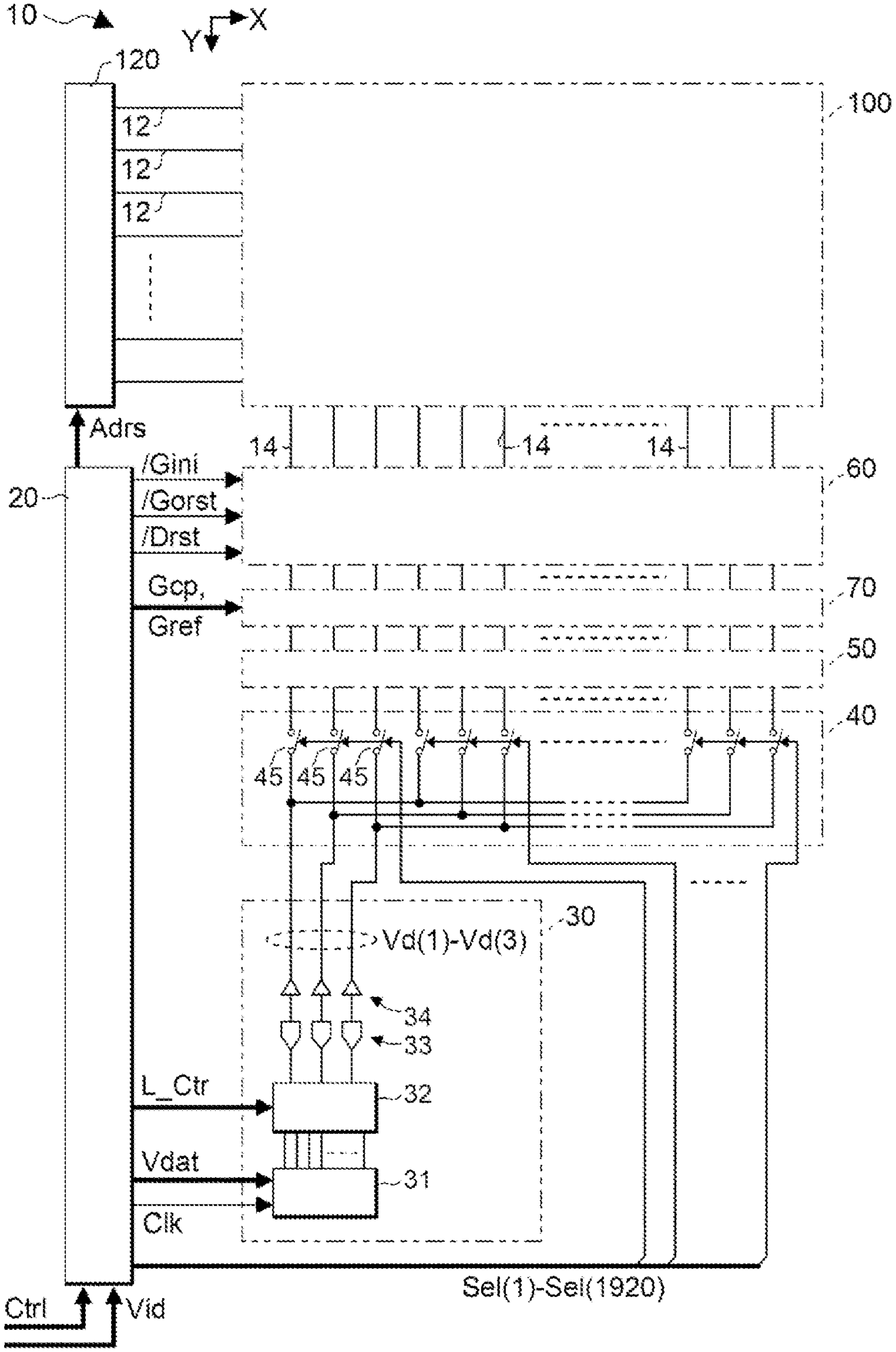
FIG. 3 is a block diagram illustrating a configuration of a main part of the electro-optical device.

FIG. 3 is a block diagram illustrating a configuration of a main part of the electro-optical device 10.

As illustrated in this figure, the electro-optical device 10 includes a control circuit 20, a data signal output circuit 30, a switch group 40, a capacitance element group 50, an initialization circuit 60, an auxiliary circuit 70, the display region 100, and a scanning line drive circuit 120.

In the display region 100, for example, scanning lines 12 in 1080 rows are provided along the X direction, and data lines 14 in 5760 (=1920×3) columns are provided along the Y direction so as to be mutually electrically insulated from the respective scanning lines 12.

Pixel circuits 110 described later are provided corresponding to intersections of the scanning lines 12 in the 1080 rows and the data lines 14 in the 5760 columns.

Figure 5:
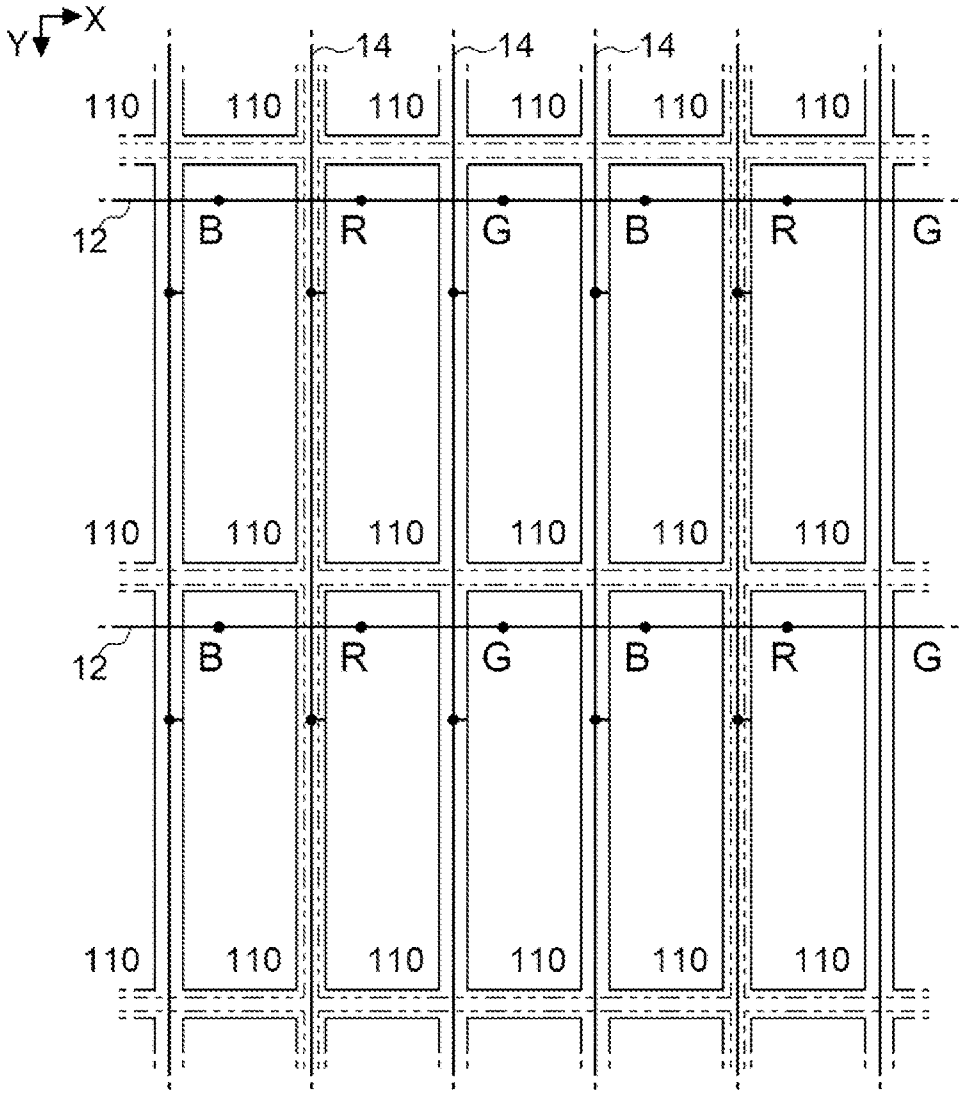
FIG. 5 is a diagram illustrating an array of pixel circuits in a display region.

The data lines 14 form one group every three columns as illustrated in FIG. 5. The three pixel circuits 110 corresponding to intersections of the scanning line 12 in one certain row and the data lines 14 in three columns belonging to the same group respectively correspond to R (red), G (green), and B (blue) pixels, and these three pixels represent one dot of a color image to be displayed. That is, in the exemplary embodiment, a color of one dot is represented with an additive color mixture by the three pixel circuits 110 corresponding to RGB.

Referring again to FIG. 3, the control circuit 20 controls each unit based on the video data Vid and the control signal Ctrl supplied from the host device 250.

The video data Vid supplied in synchronization with a synchronization signal included in the control signal Ctrl specifies a gray scale level of a pixel in an image to be displayed by the electro-optical device 10, for example, with eight bits per RGB. Furthermore, the synchronization signal includes a vertical synchronization signal instructing a start of vertical scanning of the video data Vid, a horizontal synchronization signal instructing a start of horizontal scanning, and a dot clock signal indicating timing for one pixel of the video data Vid.

The control circuit 20 generates, as logical signals, control signals Gref, Gcp, /Drst, Gorst, /Gini, L_Ctr, Sel(1) to Sel(1920), and a clock signal Clk, in order to control each unit. Further, the control circuit 20 extracts Adrs including row addresses Adrs1 and Adrs2 included in the control signal Ctrl, and supplies Adrs to the scanning line drive circuit 120.

Note that, although omitted in FIG. 3, the control circuit 20 outputs a control signal /Gcp in a logical inversion relationship with the control signal Gcp, a control signal /Gref in a logical inversion relationship with the control signal Gref, and control signals /Sel(1) to /Sel(1920) that are in a logical inversion relationship with the Sel(1) to Sel (1920), respectively.

In these logical signals, an L level corresponds to 0 V, which is a reference of voltage zero, and an H level corresponds to, for example, 6.0 V. Furthermore, control signals /Gel(1) to /Gel(1080) for light emission described below each take three levels including an M level in addition to the L level and the H level. The M level is a level of a value between the L level and the H level, and corresponds to 4 to 5 V, for example.

The scanning line drive circuit 120 is a circuit for driving the pixel circuits 110 arrayed in the 1920 rows and the 5760 columns with one row as a unit, and outputs, in addition to a scanning signal, although omitted in FIG. 3, various control signals in synchronization with the scanning signal.

The data signal output circuit 30 outputs a data signal toward the data line 14. Specifically, the data signal output circuit 30 outputs a data signal of a voltage in accordance with a gray scale level of each pixel. Note that, in the present exemplary embodiment, voltage amplitude of a data signal output from the data signal output circuit 30 is compressed, and supplied to the data line 14. Therefore, a data signal after compression also has a voltage in accordance with a gray scale level of a pixel.

Furthermore, the data signal output circuit 30 also has a function of parallel-converting serially supplied video data Vdat to a plurality of phases (in this example, "three" phases corresponding to the number of columns of data lines 14 forming a group) and outputting the plurality of phases. For the sake of brevity, the "three" phases will be used in the following.

The data signal output circuit 30 includes a shift register 31, a latch circuit 32, a D/A conversion circuit group 33, and an amplifier group 34.

The shift register 31 sequentially transfers the video data Vdat supplied serially in synchronization with the clock signal Clk, and stores the video data Vdat for a single row, that is, for 5760 pieces from a viewpoint of the number of pixel circuits 110. Note that, in the present exemplary embodiment, in order to convert the video data Vdat to the three phases for outputting, the shift register 31 sequentially stores the video data Vdat for every three phases (three pixels).

The latch circuit 32 latches the video data Vdat stored in the shift register 31 every three phases in accordance with a control signal L_Ctr, and parallel-converts the latched video data Vdat into three phases according to the control signal L_Ctr for outputting.

The D/A conversion circuit group 33 includes three D/A (Digital to Analog) converters. The video data Vdat in the three phases output from the latch circuit 32 is converted to analog signals by the three D/A converters.

The amplifier group 34 includes three amplifiers. The analog signals in the three phases output from the D/A conversion circuit group 33 are amplified by the three amplifiers, and output as data signals Vd(1), Vd(2), and Vd(3).

The control circuit 20 outputs the control signals Sel(1) to Sel(1920) that are sequentially and exclusively set to the H level in a compensation period preceding a writing period as described below.

Figure 4:
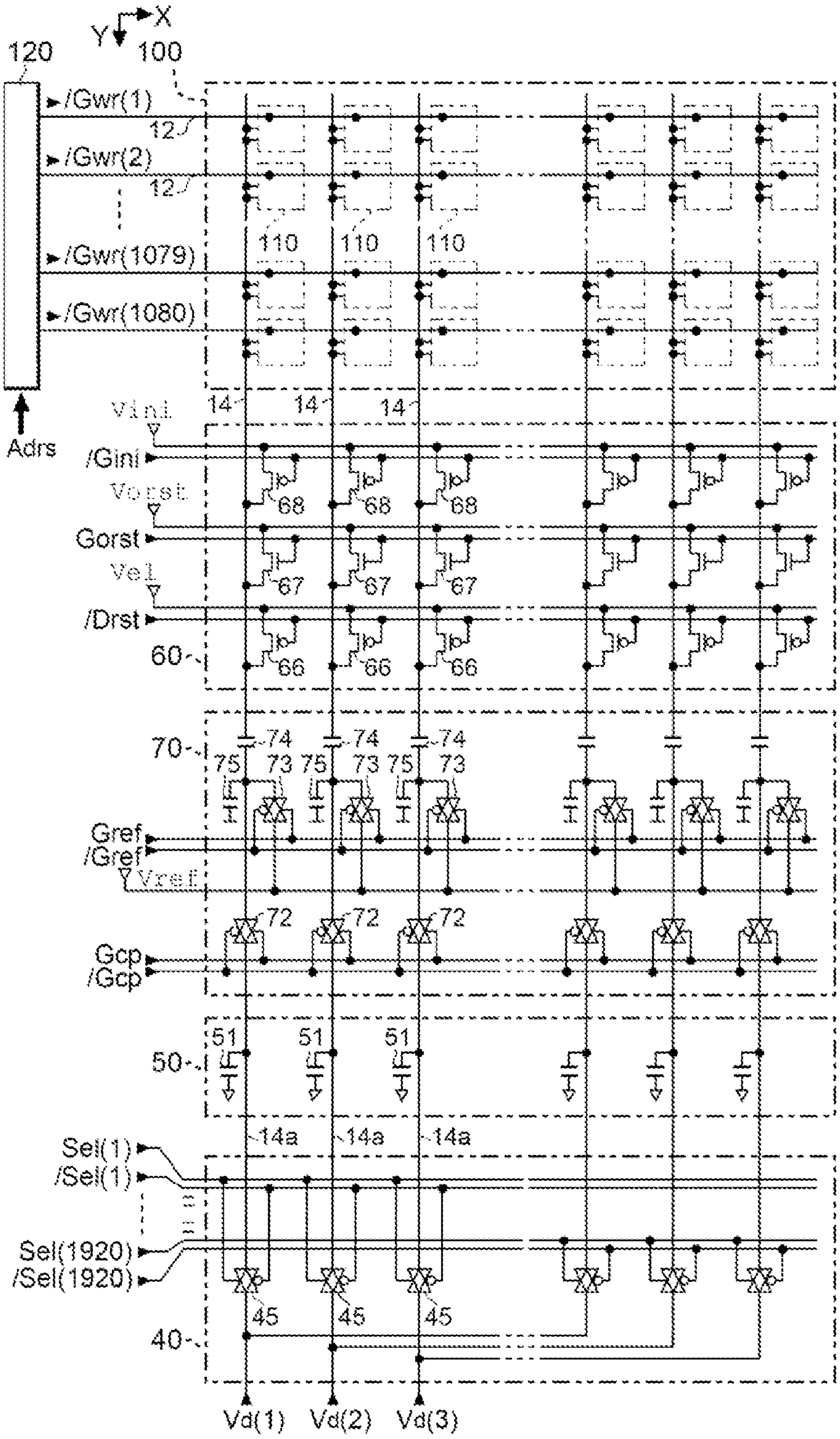
FIG. 4 is a circuit diagram illustrating a configuration of a main part in the electro-optical device.

FIG. 4 is a circuit diagram illustrating a configuration of the switch group 40, the capacitance element group 50, the initialization circuit 60, the auxiliary circuit and the display region 100, in the electro-optical device 10.

In the display region 100, as described above, the pixel circuits 110 are provided, in a matrix, corresponding to the intersections of the scanning lines 12 and the data lines 14. Specifically, the pixel circuits 110 are provided corresponding to the intersections of the scanning lines 12 in the 1080 rows and the data lines 14 in the 5760 columns. Thus, a color image represented by the electro-optical device 10 has resolution of vertical 1080 dots by horizontal 1920 dots.

In order to distinguish the rows (lines) in the matrix array, the rows may be referred to as 1st, 2nd, 3rd, . . . , 1919th, and 1920-th rows in order from above in the figure, respectively. Similarly, in order to distinguish the columns in the matrix, the columns may be referred to as 1st, 2nd, 3rd, . . . , 5759-th, and 5760-th columns in order from left, respectively.

In the present exemplary embodiment, as described above, the data lines 14 are grouped every three columns. When an integer j from 1 to 1920 is used in order to generalize and describe the group, the data lines 14 in total of three columns of a (3j−2)-th column, a (3j−1)-th column, and a (3j)-th column belong to a j-th group counted from left.

Note that, regardless of the group, in order to generalize and describe the data lines 14, an integer k from 1 to 5760 is used to use notation of "the data line 14 in a k-th column counted from left" in some cases.

The scanning line drive circuit 120 supplies scanning signals /Gwr(1), /Gwr(2), . . . , /Gwr(1079), and/Gwr(1080) in this order to the scanning lines 12 in the 1st, 2nd, 3rd, . . . , 1079-th, 1080-th rows, respectively. Note that, details of the scanning line drive circuit 120 will be described below.

In the electro-optical device 10, a data transfer line **14*a* is provided corresponding to the data line 14**.

The switch group 40 is a collection of transmission gates 45 provided for the respective data transfer lines **14*a***.

Of these, input ends of the respective 1920 transmission gates 45 corresponding to the data transfer lines **14*a*** in the 1st, 4th, 7th, . . . , 5758-th columns are commonly coupled. Note that, the data signal Vd(1) is supplied to the input end for each pixel, in time series.

Additionally, input ends of the respective 1920 transmission gates 45 corresponding to the data transfer lines **14*a*** in the 2nd, 5th, 8th, . . . , and 5759-th columns are commonly coupled, and the data signal Vd(2) is supplied for each pixel, in time series.

Similarly, input ends of the respective 1920 transmission gates 45 corresponding to the data transfer lines **14*a*** in the 3rd, 6th, 9th, . . . , and 5760-th columns are commonly coupled, and the data signal Vd(3) is supplied for each pixel, in time series.

An output end of the transmission gate 45 in one certain column is coupled to an end of the data transfer line **14*a*** in the column.

The three transmission gates 45 corresponding to the (3j−2)-th, (3j−1)-th, and (3j)-th columns belonging to the j-th group are each brought into an on-state between an input end and an output end, when a control signal Sel(j) is at the H level (when a control signal /Sel(j) is at the L level).

Note that in FIG. 4, due to space limitations, only a first group and a 1920-th group are illustrated, and other groups are omitted. Also, the transmission gate 45 in FIG. 4 is simplified and denoted as a mere switch in FIG. 3.

In the present description, the "on-state" of a switch, a transistor, or a transmission gate refers to a state where both ends of the switch, a source node and a drain node in the transistor, or both ends of the transmission gate are electrically coupled to be brought into a low-impedance state. In addition, an "off-state" of a switch, a transistor, or a transmission gate refers to a state where both ends of the switch, a source node and a drain node, or both ends of the transmission gate are not electrically coupled to be brought into a high-impedance state.

Also, "electrically coupled" or simply "coupled" in the present description means direct or indirect coupling or joint between two or more elements.

The capacitance element group 50 is a collection of capacitance elements 51 provided for the respective data transfer lines **14*a*. Here, one end of a capacitance element 41 corresponding to the data transfer line 14*a* in one certain column is coupled to one end of the data transfer line 14*a*, and another end of the capacitance element 41** is grounded to a constant potential, for example, to a potential serving as a reference of voltage zero.

The auxiliary circuit 70 is a collection of transmission gates 72 and 73 provided in the respective columns and capacitance elements 74 and 75 provided in the respective columns.

Here, the transmission gate 72 corresponding to a certain column is brought into the on-state between an input end and an output end, when the control signal Gcp is at the H level (when the control signal /Gcp is at the L level). An input end of the transmission gate 72 corresponding to a certain column is coupled to another end of the data transfer line **14*a* in the column, and an output end of the transmission gate 72 corresponding to the column is coupled to an output end of the transmission gate 73 corresponding to the column, one end of the capacitance element 74 corresponding to the column, and one end of the capacitance element 75** corresponding to the column.

The transmission gate 73 corresponding to one certain column is brought into the on-state between an input end and an output end, when the control signal Gref is at the H level (when the control signal /Gref is at the L level). An input end of the transmission gate 73 corresponding to one certain column is applied with a voltage Vref.

Also, another end of the capacitance element 75 corresponding to one certain column is grounded to a constant potential, for example, to a potential serving as a reference of voltage zero.

Another end of the capacitance element 74 corresponding to one certain column is coupled to one end of the data line 14 corresponding to the column.

The initialization circuit 60 is a collection of P channel MOS type transistors 66, 68, and N channel MOS type transistors 67 provided for the respective data lines 14.

A gate node of the transistor 66 corresponding to the data line 14 in one certain column is supplied with the control signal /Drst, a source node of the transistor 66 is applied with a voltage Vel, and a drain node of the transistor 66 is coupled to the data line 14 in the column.

Further, a gate node of the transistor 67 corresponding to the data line 14 in one certain column is supplied with the control signal Gorst, a source node of the transistor 67 is applied with a voltage Vorst, and a drain node of the transistor 67 is coupled to the data line 14 in the column. A gate node of the transistor 68 corresponding to the data line 14 in one certain column is supplied with the control signal /Gini, a source node of the transistor 68 is applied with a voltage Vini, and a drain node of the transistor 68 is coupled to the data line 14 in the column.

Figure 6:
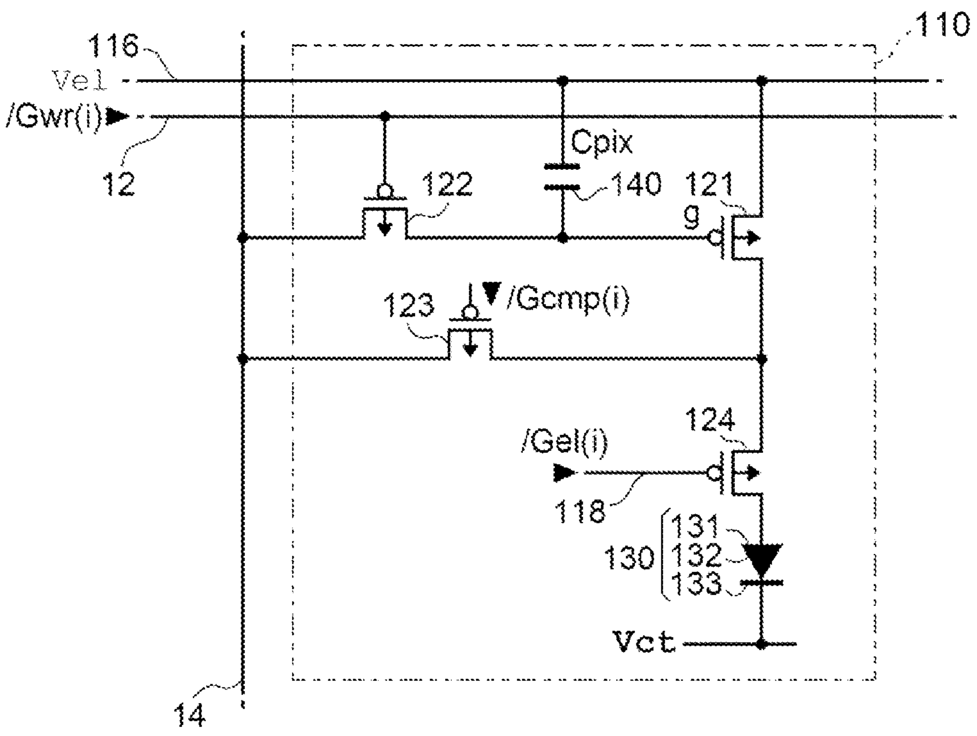
FIG. 6 is a diagram illustrating a configuration of the pixel circuit in the electro-optical device.

FIG. 6 is a diagram illustrating a configuration of the pixel circuit 110. The pixel circuits 110 arrayed in the 1080 rows by the 5760 columns are electrically identical to each other. Thus, the pixel circuits 110 will be explained, by using one pixel circuit 110 corresponding to an i-th row and the k-th column as a representative.

As illustrated in the figure, the pixel circuit 110 includes P channel MOS type transistors 121 to 124, an OLED 130, and a capacitance element 140.

Further, the pixel circuit 110 in the i-th row is supplied with, in addition to a scanning signal /Gwr(i), control signals /Gcmp(i) and /Gel(i) from the scanning line drive circuit 120.

The OLED 130 is an example of a display element, and a pixel electrode 131 and a common electrode 133 sandwich a light emission function layer 132. The pixel electrode 131 functions as an anode, and the common electrode 133 functions as a cathode. Note that, the common electrode 133 has light reflectivity and optical transparency. When a current flows from the anode toward the cathode in the OLED 130, holes injected from the anode and electrons injected from the cathode are recombined in the light emission function layer 132 to generate excitons and generate white light.

In a case of color display as in the present exemplary embodiment, the generated white light resonates in an optical resonator configured with, for example, a reflective layer and a semi-reflective semi-transmissive layer (not illustrated), and is emitted with a resonance wavelength that is set corresponding to one of colors of R (red), G (green), and B (blue). A color filter corresponding to the color is provided on an emission side of the light from the optical resonator. Thus, the emitted light from the OLED 130 is subjected to coloration by the optical resonator and the color filter, and is visually recognized by an observer. Note that, the optical resonator is not illustrated. In addition, when the electro-optical device 10 simply displays a monochromatic image with only brightness and darkness, the above color filter is omitted.

In the transistor 121 of the pixel circuit 110 in the i-th row and the k-th column, a gate node g is coupled to a drain node of the transistor 122, and a source node is coupled to a power supplying line 116 having the voltage Vel, and a drain node is coupled to a source node of the transistor 123 and a source node of the transistor 124. Note that, in the capacitance element 140, one end is coupled to the gate node g of the transistor 121, and another end is coupled to a constant voltage, for example, to the power supplying line 116 having the voltage Vel. Thus, the capacitance element 140 holds a potential of the gate node g in the transistor 121.

Note that, as the capacitance element 140, for example, a capacitor which is parasitic to the gate node g of the transistor 121 may be used, or and a capacitor formed by interposing an insulating layer between mutually different conductive layers in a silicon substrate may be used.

In the transistor 122 of the pixel circuit 110 in the i-th row and the k-th column, a gate node is coupled to the scanning line 12 in the i-th row, and a source node is coupled to the data line 14 in the k-th column.

In the transistor 123 of the pixel circuit 110 in the i-th row and the k-th column, the control signal /Gcmp(i) is supplied to a gate node, and a drain node is coupled to the data line 14 in the column. In the transistor 124 of the pixel circuit 110 in the i-th row and the k-th column, the control signal /Gel(i) is supplied to a gate node, and a drain node is coupled to the pixel electrode 131, which is the anode of the OLED 130. Note that, the control signal /Gel(i) is supplied via a light emission control line 118 in the i-th row from the scanning line drive circuit 120.

The common electrode 133 that functions as the cathode of the OLED 130 is coupled to a power supplying line having the voltage Vct. In addition, since the electro-optical device 10 is formed at a silicon substrate, a substrate potential of each of the transistors 121 to 124 is a potential corresponding to the potential Vel, for example.

Next, what kind of the video data Vid is supplied by the host device 250, and what kind of driving is performed by the electro-optical device 10 to perform displaying based on the video data Vid will be described.

Figure 7:
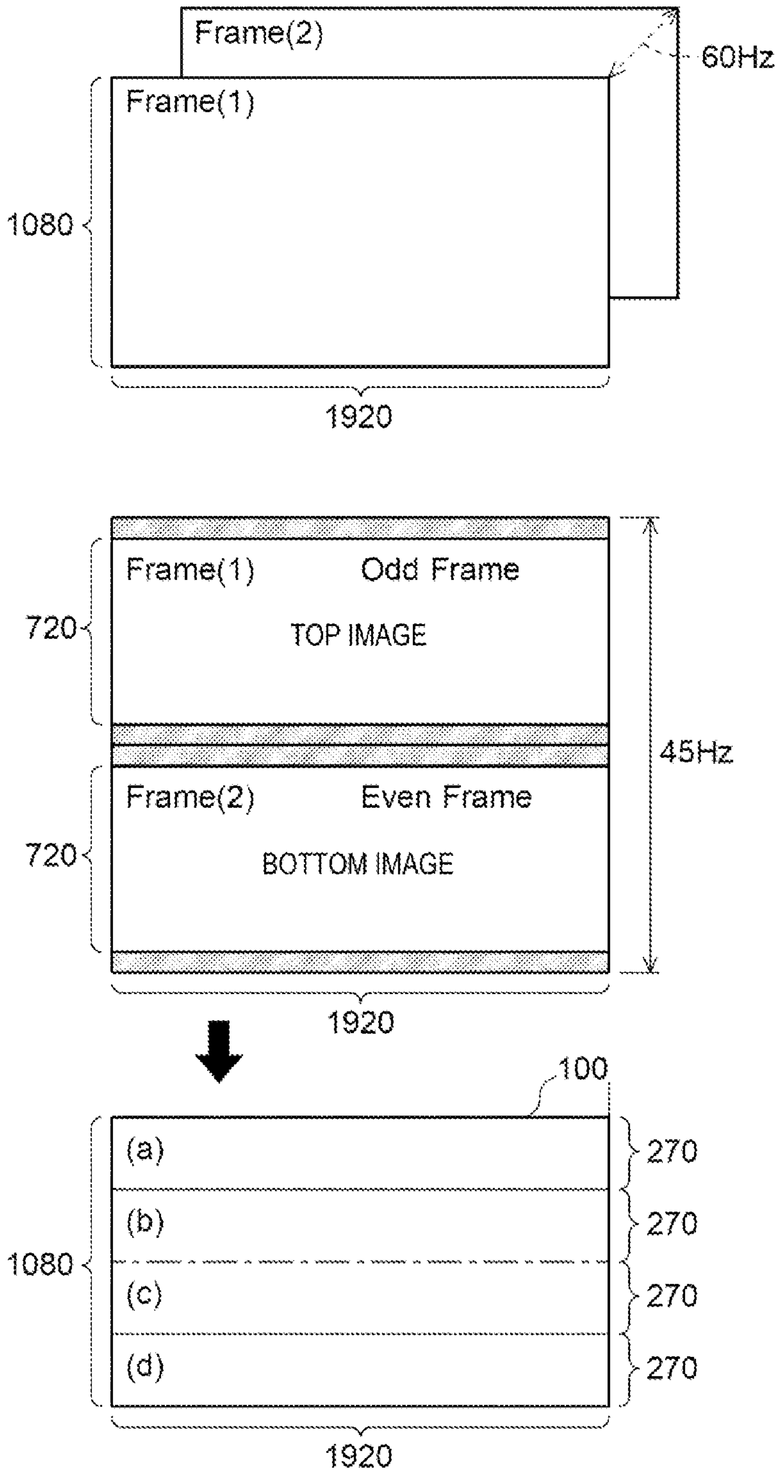
FIG. 7 is an explanatory diagram of video data supplied to the electro-optical device from a host device.

FIG. 7 is a diagram for explaining the video data Vid supplied from the host device 250 to the electro-optical device 10.

In the electro-optical device 10, resolution that can be expressed for a color image is the vertical 1080 dots by the horizontal 1920 dots as described above.

Therefore, as illustrated in an upper section of the figure, simply, it is sufficient that video data for three colors of RGB per dot is supplied to the electro-optical device 10, in the vertical 1080 dots by the horizontal 1920 dots, at a frequency of a vertical synchronization signal (vertical synchronization frequency, for example, 60 Hz).

However, when such video data is supplied to the electro-optical device 10 for the electro-optical device 10 to display the video data, and when supporting of a high-speed display at 90 Hz or more for game application is attempted, for example, a driving frequency is increased, and power consumption is increased.

Thus, first, in the present exemplary embodiment, as illustrated in a middle section in the figure, in the host device 250, images for two frames that are temporally continuous are separated as a top image including vertical 720 lines and a bottom image including vertical 720 lines, and are caused to be arrayed as one image.

A sum of the number of lines in the top image and the number of lines in the bottom image is "1440", and thus a data amount is reduced to ⅔ as compared to two screens each including the number of lines "1080". Thus, a vertical synchronization frequency when the host device 250 supplies the video data Vid to the electro-optical device 10 corresponds to 45 Hz.

In the electro-optical device 10, a period in which the vertical synchronization frequency is 45 Hz is divided into an odd frame period and an even frame period, and the top image is caused to be displayed in the odd frame period, and the bottom image is caused to be displayed in the even frame period.

In the present exemplary embodiment, two screens for the odd frame and even frame are displayed in the period in which the vertical synchronization frequency is 45 Hz, thus a display in the odd frame and the even frame is visually recognized as substantially being displayed at a vertical synchronization frequency of 90 Hz, which is twice 45 Hz.

Note that, in the present description, the period in which the vertical synchronization frequency is 45 Hz is referred to as a frame period. Furthermore, when not particularly distinguished, the odd frame period and the even frame period may be referred to as subframe periods.

Blanking is inserted at each of an upper end and a lower end of the top image and each of an upper end and a lower end of the bottom image, as indicated by hatching. A sum of the number of lines of blanking inserted at the top end of the top image and the number of lines of blanking inserted at the bottom end of the bottom image is set to be approximately equal to a sum of the number of lines of blanking inserted at the lower end of the top image and the number of lines of blanking inserted at the upper end of the bottom image.

The top image and the bottom image both include the vertical 720 lines, whereas the number of vertical rows of the electro-optical device 10 is “1080”.

Thus, Next, the display region 100 of the electro-optical device 10 is divided into four regions in order from above of regions (a), (b), (c), and (d) each including vertical 270 rows, as illustrated in a bottom section of the figure. Note that “division” here is not meant to physical division, and is used in a sense that a region to be supplied with signals is divided for convenience.

Since the region (a) is located at an upper end of the display region 100, and the region (d) is located at a lower end of the display region 100, even when the regions (a) and (d) deteriorate, an observer of a display screen of the electro-optical device 10 is less likely to recognize the deterioration as deterioration. Thus, in the electro-optical device 10, for each of the regions (a) and (d), the vertical 270 rows are caused to be displayed with ½ image quality by, for example, driving two rows simultaneously.

With respect to the regions (a) and (d), the regions (b) and (c) are located at a center of the display region 100, and thus the observer of the display screen of the electro-optical device 10 is more likely to gaze the regions (b) and (c). Thus, in the electro-optical device 10, for each of the regions (b) and (c), the vertical 270 lines are caused to be displayed with ⅚ display quality, for example, while deterioration is suppressed, or reduced. Specifically, when six rows are considered as one block, driving is performed to display video data of the top image or the bottom image for five rows among the six rows, and for the remaining one row, driving is performed to display the same video data as that of one row adjacent in the Y direction.

Figure 8:
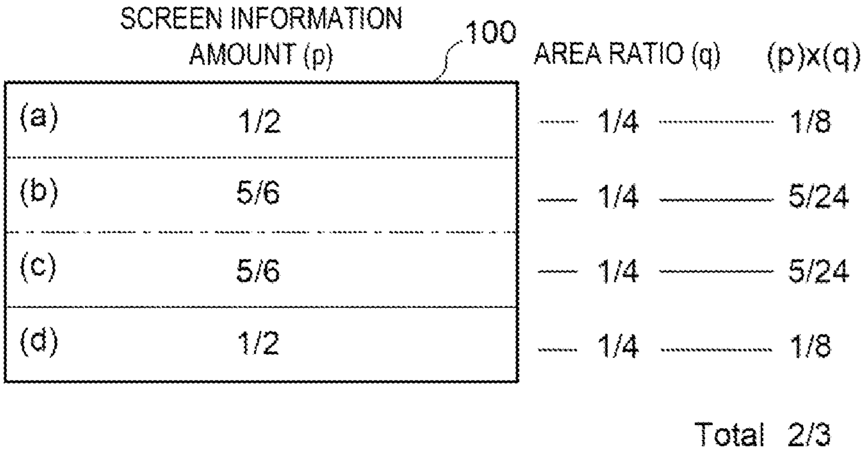
FIG. 8 is a diagram for explaining a reduction in video data in a Y direction.

FIG. 8 is a diagram for explaining a data reduction in the present exemplary embodiment.

Since each of the regions (a) and (d) has ½ image quality, thus an amount of image information also becomes ½ for each. Since each of the regions (b) and (c) has ⅚ image quality, thus an amount of image information also becomes ⅚ for each.

Since each of the regions (a), (b), (c), and (d) is ¼ of the display region 100, a data amount of the video data Vid supplied to the electro-optical device 10 from the host device 250 becomes ⅔ compared to a configuration in which the video data of the top image and the bottom image is supplied as is.

Next, a specific driving procedure in the present exemplary embodiment will be described.

As described above, in the present exemplary embodiment, in the host device 250, as illustrated in FIG. 7, the images for the two frames that are temporally continuous are separated as the top image including the vertical 720 lines and the bottom image including the vertical 720 lines, and are caused to be arrayed as one image.

In the electro-optical device 10, the period in which displaying is performed at the vertical synchronization frequency is divided into the odd frame period and the even frame period, and the top image is caused to be displayed in the odd frame period, and the bottom image is caused to be displayed in the even frame period.

In the odd frame period, the host device 250 supplies, for video data corresponding to the regions (a) and (d) of video data for 720 lines in the top image, the video data Vid for odd-numbered rows to the electro-optical device 10 together with the row addresses Adrs1 and Adrs2 indicating the respective rows.

Note that, the row addresses Adrs1 and Adrs2 here are each a row number, when the 720 rows in the top image are counted from above.

In the electro-optical device 10, the video data Vid for the odd-numbered row corresponding to the region (a) or (d) is caused to be displayed with two rows, including not only the odd-numbered row, but an even-numbered row adjacent to the odd-numbered row in the Y direction.

Thus, in the scanning line drive circuit 120 in the electro-optical device 10, a concept of a primary and a secondary is introduced in the driving of the scanning line 12.

The secondary means pertaining to the primary, more particularly, means operating in the same manner as the primary, and when the secondary is set, to which primary the secondary is subordinate is also certainly set. Conversely, however, no secondary is set to the primary in some cases.

Note that, in the present exemplary embodiment, the scanning line 12 adjacent to the scanning line 12 set to the secondary in one of a positive Y direction (downward direction) or a negative Y direction (upward direction) is set to the primary.

When the scan line 12 in one certain row is set to the primary, and the scanning line 12 is specified with the row address Adrs1, the primary scanning line 12 is selected for horizontal scanning. When the scanning line 12 in one certain row is set to the secondary, and the scanning line 12 set to the primary is specified with the row address Adrs1, two lines of the primary scanning line 12 and the secondary scanning line 12 are selected simultaneously for horizontal scanning.

Figure 9:
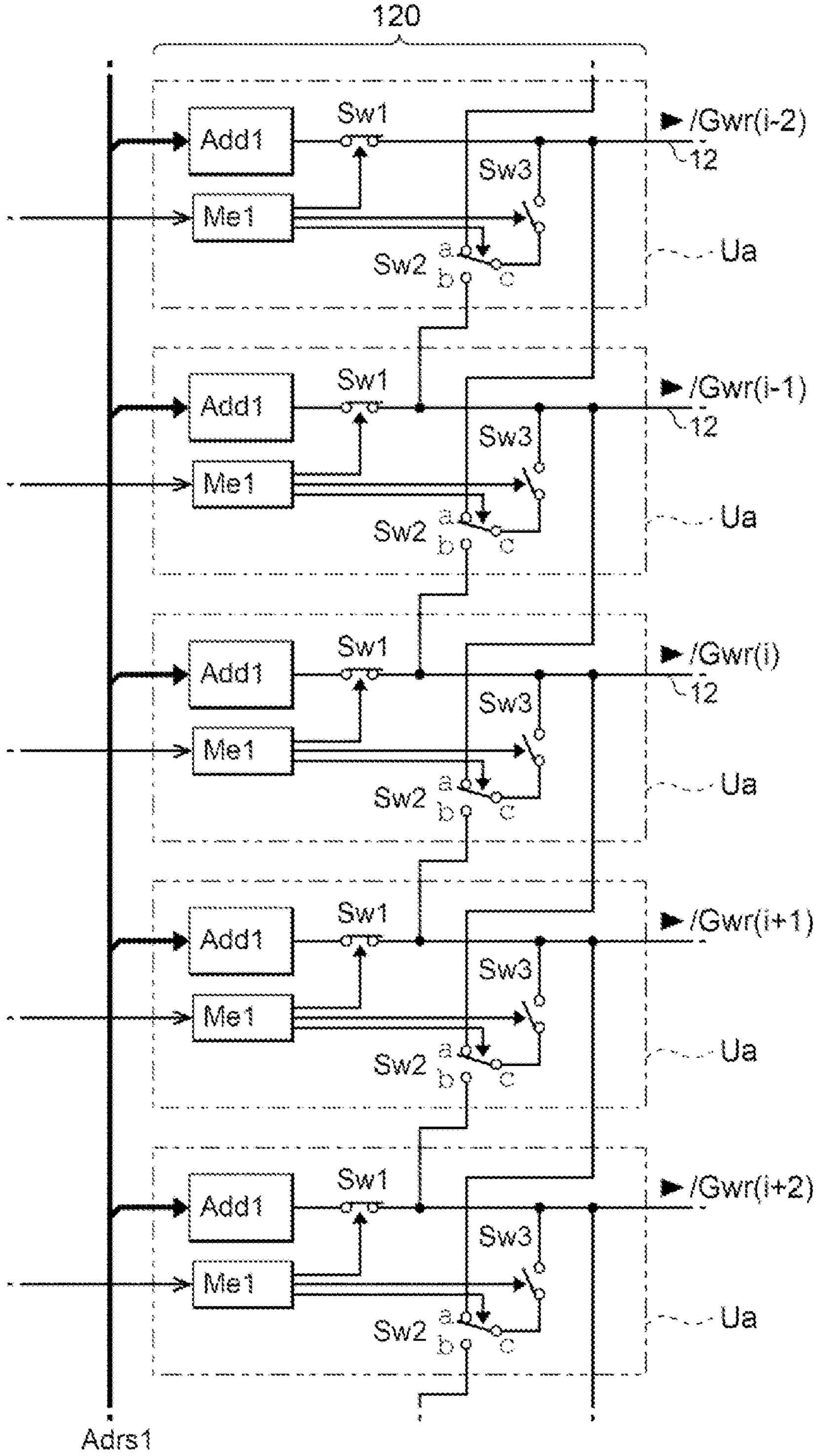
FIG. 9 is a diagram illustrating an example of a unit circuit that outputs a scanning signal.

FIG. 9 is a block diagram illustrating an example of a configuration, of the scanning line drive circuit 120, for supplying scanning signals. Note that, in the figure, for simplicity, a configuration is illustrated for supplying (i−2)-th to (i+2)-th rows with scanning signals/Gwr(i−2) to /Gwr (i+2), respectively.

As illustrated in this figure, a unit circuit Ua is provided for each scanning line 12 to supply the scanning signal. The unit circuit Ua includes an address decoder Add1, a holding unit Me1, switches Sw1, Sw2, and Sw3.

The unit circuit Ua is common to each row, and thus is described by using the i-th row. The holding unit Me1 in the i-th row holds information specifying whether the i-th row is the primary or the secondary, and information indicating, when the i-th row is the secondary, whether the i-th row is dependent on the scanning line 12 in the (i−1)-th row adjacent in an upward direction or dependent on the scanning line 12 in the (i+1)-th row adjacent in a downward direction. Note that, the information stored in the holding unit Me1 is supplied, for example, from the control circuit 20.

When, in one certain horizontal scanning period, the i-th row of the horizontal scanning period is specified by the row address Adrs1, the address decoder Add1 outputs the scanning signal /Gwr(i) to select the scanning line 12 in the i-th row in the horizontal scanning period.

The switch Sw1 is provided between an output end of the address decoder Add1 and the scanning line 12, is brought into the on-state when information to set to the primary is held in the holding unit Mel, and brought into the off-state when information to set to the secondary is held.

The switch Sw2 is of a single pole double throw type, and a contact point a is electrically coupled to the scanning line 12 in the (i−1)-th row, and a contact point b is coupled to a scanning line in the (i+1)-th row. The switch Sw2 selects the contact point a when information is stored, in the holding unit Me1, that is dependent on the scanning line 12 adjacent in the upward direction, and selects the contact a when information dependent on the scanning line 12 adjacent in the downward direction is stored.

The switch Sw3 is provided between a contact point c in common with the switch Sw2 and the scanning line 12 in the i-th row, is brought into the off-state when information to set to the primary is held in the holding unit Me1, and brought into the on-state when information to set to the secondary is held. That is, switches Sw1 and Sw3 are mutually exclusively brought into the on-state or off-state.

In such a configuration, in a state where the i-th row is set to the primary, when the i-th row is specified with the row address Adrs1, the switch Sw1 is brought into the on-state, and thus switch Sw3 is brought into the off-state, the scanning signal /Gwr(i) indicating that the i-th row is selected is output to the scanning line 12 in the i-th row.

In a state where the i-th row is set to the secondary, when the i-th row is dependent on the (i−1)-th row, the switch Sw1 is brought into the off-state, thus the switch SW2 selects the contact point a, and the switch Sw3 is brought into the on-state. Thus, the scanning line 12 in the i-th row is supplied with the scanning signal /Gwr (i−1) in the (i−1)-th row.

In a state where the i-th row is set to the secondary, when the i-th row is dependent on the (i+1)-th row, the switch Sw1 is brought into the off-state, thus the switch SW2 selects the contact point b, and the switch Sw3 is brought into the on-state. Thus, the scanning line 12 in the i-th row is supplied with the scanning signal /Gwr(i+1) in the (i+1)-th row.

Figure 10:
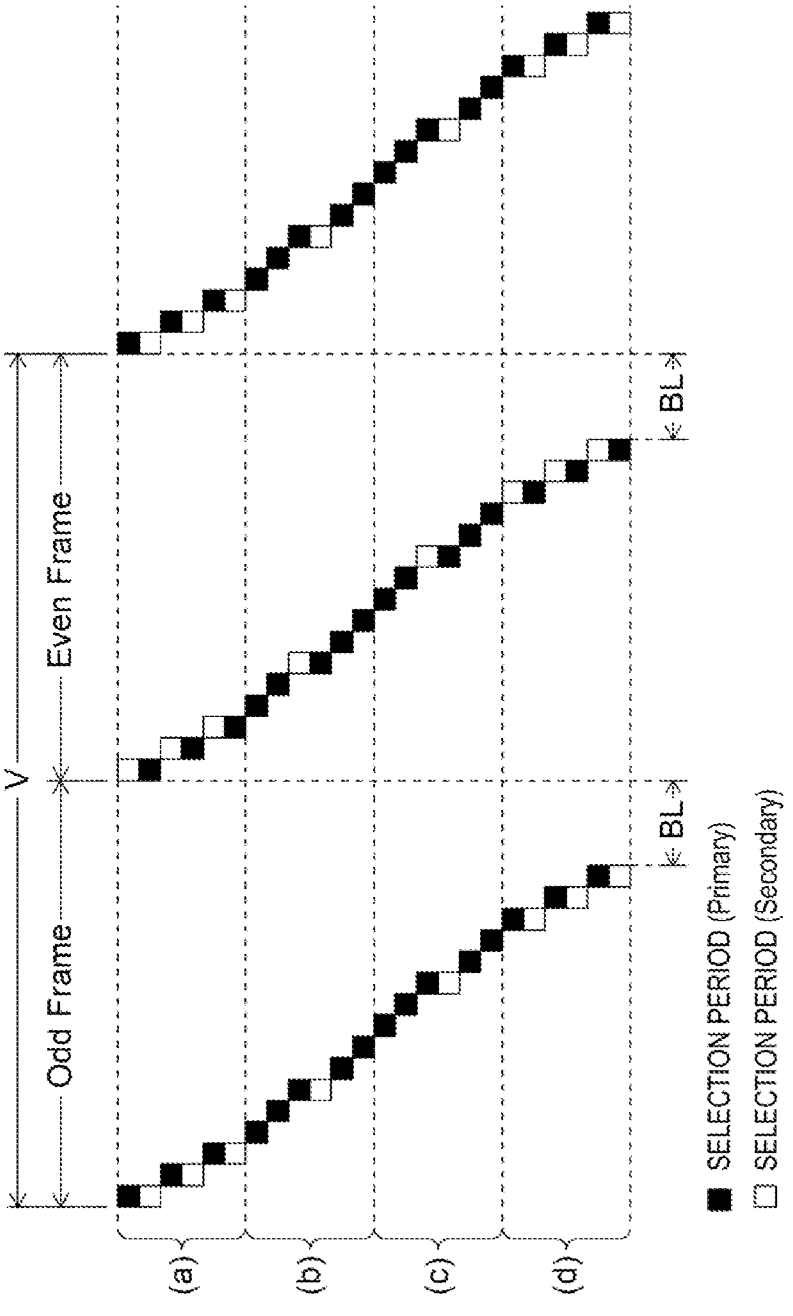
FIG. 10 is a diagram illustrating selection of scanning lines and a transition between a primary and a secondary.

FIG. 10 is an example of a figure illustrating, over time, selection of the scanning lines 12 in the odd frame period and the even frame period, and setting of the primary and the secondary for each scanning line 12. Note that, in the display region 100 in the electro-optical device 10, the regions (a), (b), (c), and (d) each include 270 rows. However, in FIG. 10, the regions (a), (b), (c), and (d) are simplified to each include six rows.

This figure illustrates that, a horizontal axis indicates elapsed time, and a vertical axis indicates row numbers of the scanning lines 12, the row numbers are counted as 1, 2, 3, . . . , in order from above, and the regions (a), (b), (c), and (d) are simplified to each include six rows.

In the odd frame period, an odd-numbered (1, 3, . . . ) row is set to the primary in a block of the six rows in the region (a), and an even numbered (2, 4, . . . ) row is set to the secondary dependent on the odd-numbered row one row above.

In the figure, a selection period for one row (one horizontal scanning period) is indicated by a square frame, a black frame indicates that a row is set to the primary and a white frame indicates that a row is set to the secondary. Furthermore, the secondary indicates being dependent on the black primary that is in the same selection period.

In the odd frame period, in a block of six rows in the region (b), (1st, 2nd, 3rd, 5th, and 6th) rows counted from above are set to the primary, and a 4th row is set to the secondary dependent on a 3rd row.

In the odd frame period, a block of six rows in the region (c) is similar to that in the region (b). In the odd frame period, a block of six rows in the region (d) is similar to that in the region (b).

In an even frame period following the odd frame period, an even-numbered row is set to the primary in the block of six rows in the region (a), and the odd-numbered row is set to the secondary dependent on the even-numbered row one row below.

In the even frame period, in the block of six rows in the region (b), the (1st, 2nd, 4th, 5th, and 6th) rows are set to the primary, and the 3rd row is set to the secondary dependent on the 4th row.

In the even frame period, the block of six rows in the region (c) is similar to that in the region (b). In the even frame period, the block of six rows in the region (d) is similar to that in the region (b).

Note that, in the figure, a period BL since a selection period for the last row in the odd frame period or the even frame period ends until a selection period for a leading row starts in the next even frame period or odd frame period is a period corresponding to blanking inserted into each of an upper end and a lower end of a top image and each of an upper end and a lower end of a bottom image.

Figure 11:
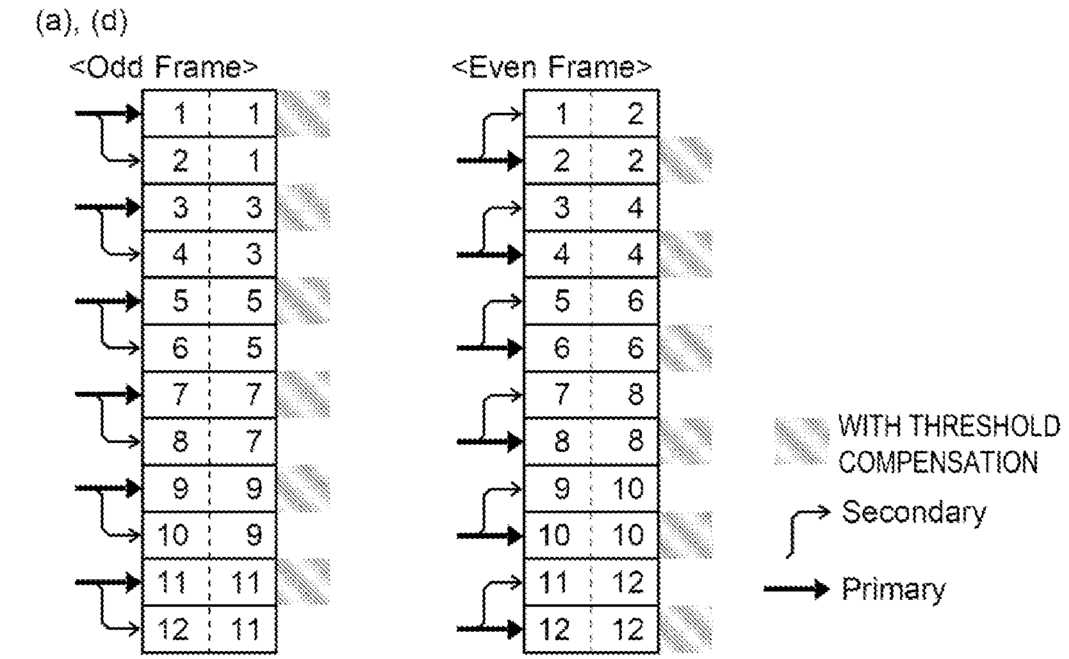
FIG. 11 is a diagram illustrating selection of the scanning lines in regions (a) and (d).

FIG. 11 is a diagram illustrating setting of the primary and the secondary, and display contents of the scanning lines 12 in the regions (a) and (d). Note that, in FIG. 11, 12 rows in each of the regions (a) and (d) are extracted for simplification.

In an odd frame period, an odd-numbered (1, 3, . . . ) row is set to the primary for the scanning lines 12 in each of the regions (a) and (d), and an even-numbered (2, 4, . . . ) row is set to the secondary dependent on the odd-numbered row one row above, thus the 1st and 2nd rows, the 3rd and 4th rows, and the and 6th rows have same display contents.

In the even frame period, the even-numbered (2, 4, . . . ) row is set to the primary for the scanning lines 12 in each of the regions (a) and (d), and the odd-numbered (1, 3, . . . ) row is set to the secondary dependent on the even-numbered row one row below, thus the 1st and 2nd rows, the 3rd and 4th rows, and the and 6th rows have the same display contents.

Note that in FIG. 11, a left section of a square frame indicates a row number of a row among the 12 rows, and a right section indicates a line number of an image displayed. In addition, in the present exemplary embodiment, compensation for a threshold voltage of the transistor 121 (threshold compensation) is performed in the scanning line 12 set to the primary.

Figure 12:
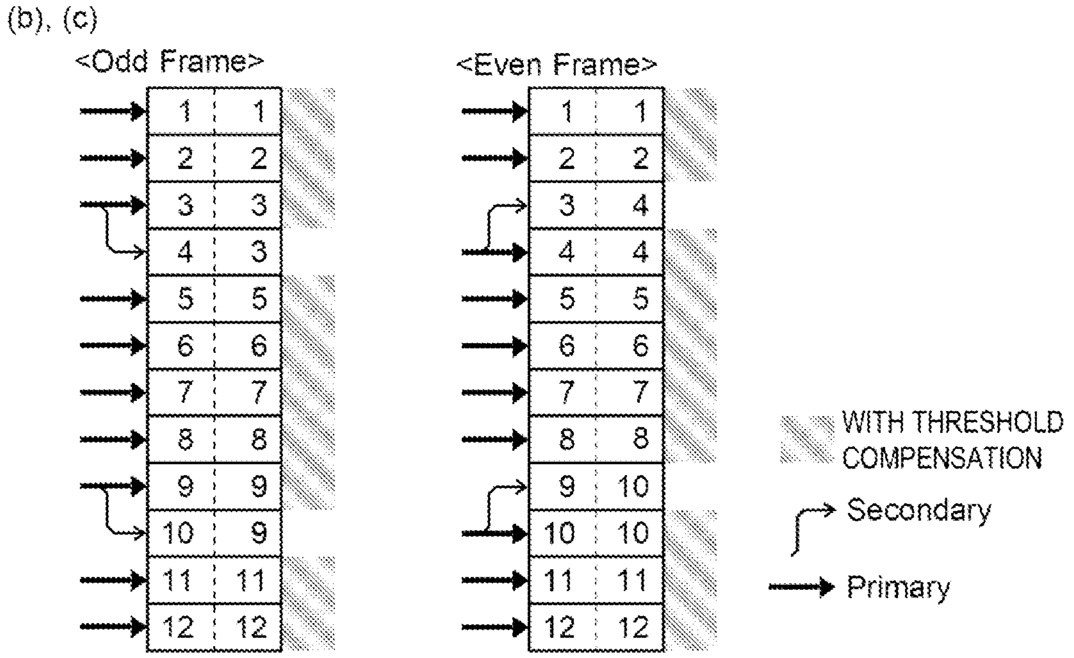
FIG. 12 is a diagram illustrating selection of the scanning lines in regions (b) and (c).

FIG. 12 is a diagram illustrating setting of the primary and the secondary, and display contents of the scanning lines 12 in the regions (b) and (c). Note that in FIG. 12, 12 rows in each of the regions (b) and (c) are extracted for simplification.

In an odd frame period, 1st, 2nd, 3rd, 5th, and 6th rows are set to the primary for the scanning lines 12 in each of the regions (b) and (c), and a 4th row is set to the secondary dependent on the 3rd row one row above, thus the 3rd and 4th rows have the same display contents.

In an odd frame period, the 1st, 2nd, 4th, 5th, and 6th rows are set to the primary for the scanning lines 12 in each of the regions (b) and (c), and the 3rd row is set to the secondary dependent on the 4th row one row below, thus the 3rd and 4th rows have the same display contents.

Figure 13:
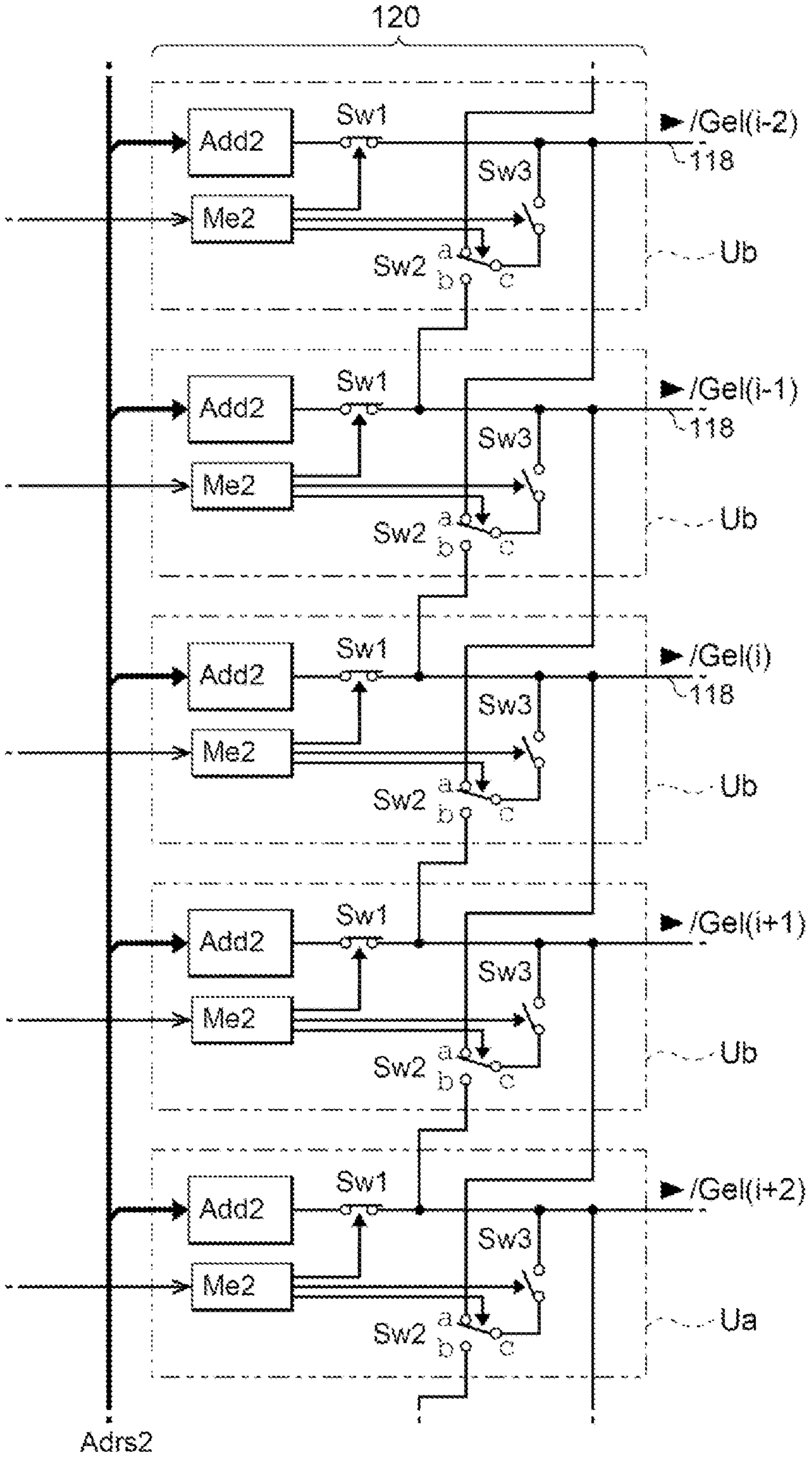
FIG. 13 is a diagram illustrating an example of a unit circuit that outputs a control signal for light emission.

FIG. 13 is a block diagram illustrating an example of a configuration, of the scanning line drive circuit 120, for supplying scanning signals for light emission. Note that, in the figure, for simplicity, a configuration is illustrated for supplying the (i−2)-th to (i+2)-th rows with scanning signals /Gel(i−2) to /Gel(i+2), respectively.

As illustrated in this figure, a unit circuit Ub is provided for each scanning line 12 to supply the control signal for light emission. The unit circuit Ub includes an address decoder Add2, a holding unit Me2, the switches Sw1, Sw2, and Sw3.

The unit circuit Ub is common to each row and is substantially similar to the unit circuit Ua for supplying the scanning signal. Here, differences between the unit circuit Ub and the unit circuit Ua will be described. In order to supply the control signal for light emission, a concept of a primary and a secondary is introduced as in the case of the scanning signals. Thus, in the unit circuit Ub in the i-th row, the holding unit Me2 holds information specifying whether the i-th row is the primary or the primary, and information indicating, when the i-th row is the secondary, whether the i-th row is dependent on the (i−1)-th row adjacent in the upward direction or dependent on the (i+1)-th row adjacent in the downward direction.

Note that, the information stored in the holding unit Me2 is supplied from the control circuit 20.

Figure 16:
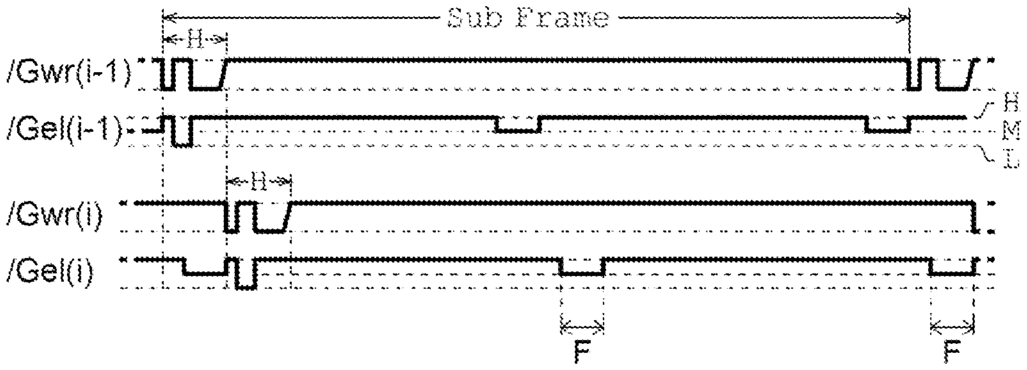
FIG. 16 is a timing chart illustrating operation of the electro-optical device.

The address decoder Add2 in the i-th row, when the i-th row is specified by the row address Adrs2, outputs the control signal /Gel(i) illustrated in FIG. 16 in a horizontal scanning period in which the i-th row is selected and after the horizontal scanning period.

The control signal for light emission takes either of the three values of L level, M level and H level as described above. Of a waveform of the control signal /Gel(i) in the i-th row, a waveform in the horizontal scanning period in which the i-th row is selected will be described later, and after the horizontal scanning period, there are two periods (F) in which the control signal is set to the M level until the i-th row is selected in the next subframe, and the control signal is kept at the H level in other than the periods.

Note that, for the i-th row, the period (F) in which the control signal /Gel(i) is set to the M level is a light emission period, and a period other than that is a non-light emission period.

Figure 14:
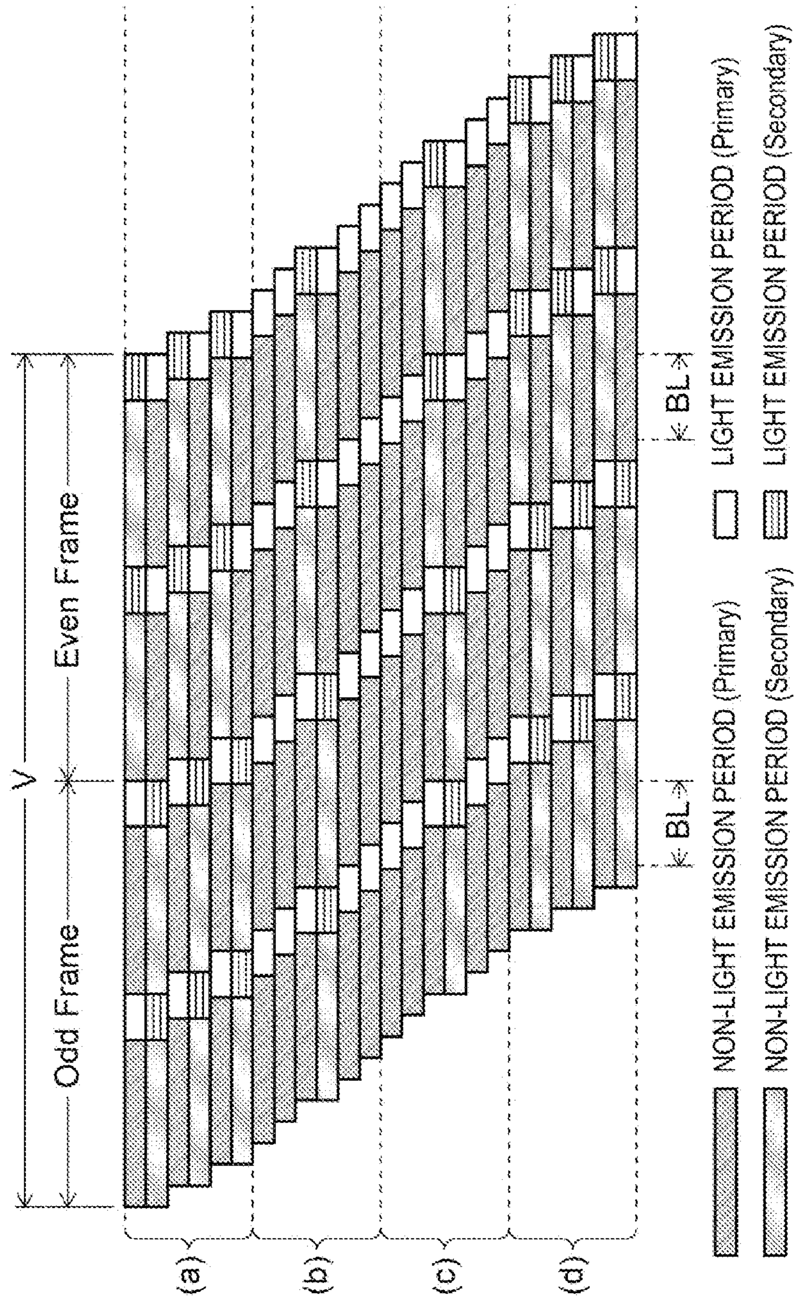
FIG. 14 is a diagram illustrating a transition between a light emission period and a non-light emission period.

FIG. 14 is an example of a figure illustrating, over time, the light emission period (F) in an odd frame period and an even frame period, and setting of the primary and the secondary for each row. Note that, FIG. 14 also indicates that, similar to FIG. 10, a horizontal axis indicates elapsed time, and a vertical axis indicates row numbers of the scanning line 12, the row numbers are counted as 1, 2, 3, . . . , in order from above, and the regions (a), (b), (c), and (d) are simplified to each include six rows.

As illustrated in this figure, in the present exemplary embodiment, the number of light emission periods (F) is two in the odd frame period or the even frame period, and is four from a viewpoint of a period V of a vertical synchronization signal of 45 Hz, and the light emission periods (F) are set at approximately regular intervals.

When the light emission periods (F) are set at irregular intervals, flicker may be caused, but it is easy to arrange the light emission periods (F) at approximately regular intervals by insertion of the blanking period BL as in the present exemplary embodiment.

Setting of the primary and the secondary in the control signal for light emission is similar to that in the primary and the secondary of the scanning signal.

Thus, as illustrated in FIG. 14, in the odd frame period, an odd-numbered (1, 3, . . . ) row is set to the primary in a block of six rows in each of the regions (a) and (d), and an even numbered (2, 4, . . . ) row is set to the secondary dependent on the odd-numbered row one row above. In an even frame period, the even-numbered (2, 4, . . . ) row is set to the primary in the block of six rows in each of the regions (a) and (d), and the odd numbered (1, 3, . . . ) row is set to the secondary dependent on the even-numbered row one row above.

In addition, in the odd frame period, in a block of six rows in each of the regions (b) and (c), 1st, 2nd, 3rd, 5th, and 6th rows are set to the primary, and a 4th row is set to the secondary dependent on the 3rd row one row above. In the even frame period, in the block of six rows in each of the regions (b) and (c), the 1st, 2nd, 4th, 5th, and 6th rows are set to the primary, and the 3rd row is set to the secondary dependent on the 4th row one row below.

Note that, in the present exemplary embodiment, the switching of the information indicating the primary or the secondary stored in the holding unit Me2 is performed after the row address Adrs2 selected the primary in the preceding stage.

Figure 15:
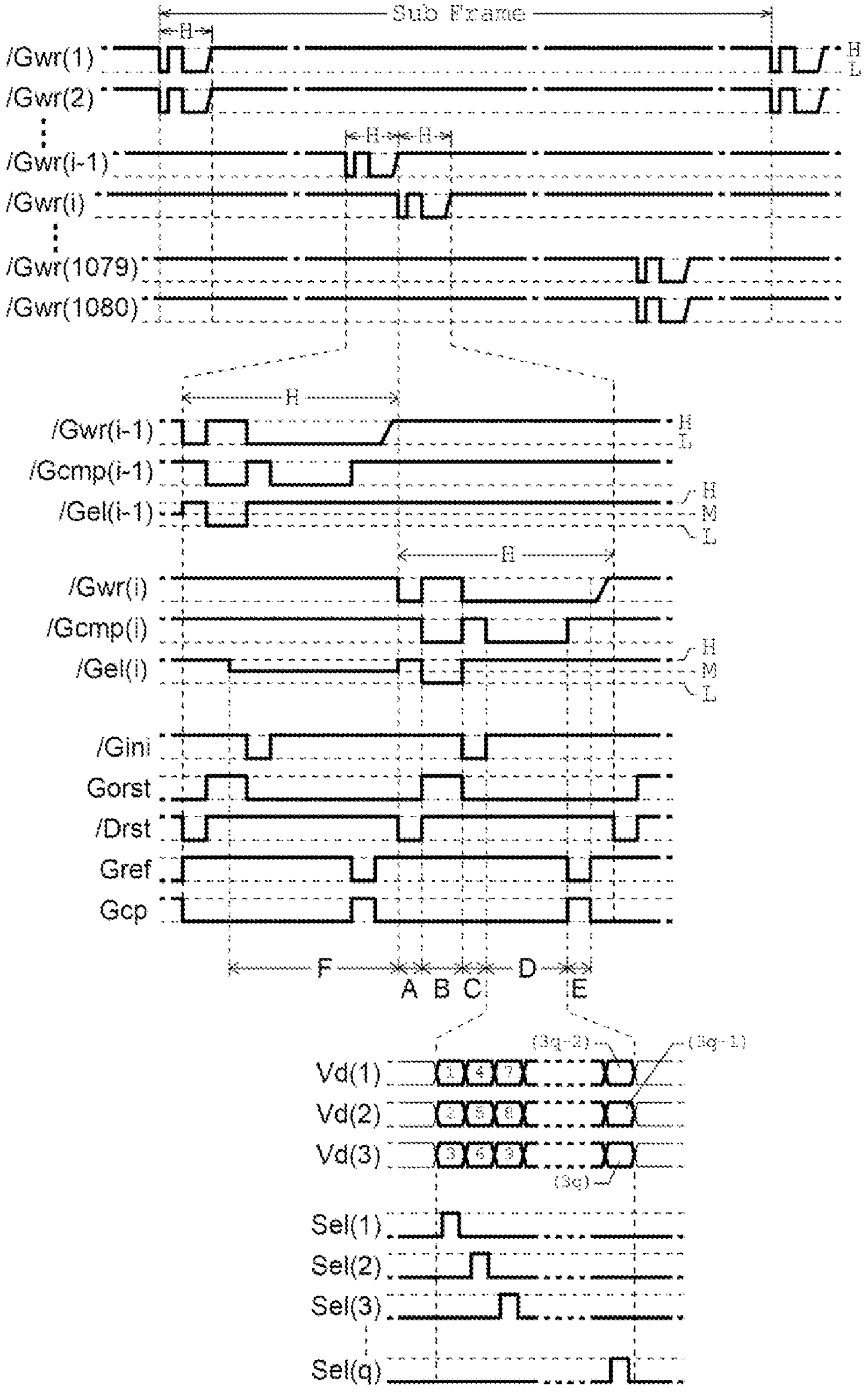
FIG. 15 is a timing chart illustrating operation of the electro-optical device.

FIG. 15 is a timing chart for explaining operation of the electro-optical device 10, and FIG. 16 is a diagram illustrating an example of a relationship between a scanning signal and a control signal for light emission.

In the present exemplary embodiment, in the odd frame period and the even frame period, the primary or the secondary is set for each row in the regions (a), (b), (c) and (d), but when one certain row is focused, operation is common for selection in the horizontal scanning period (H). Also, operation is also common to the pixel circuits 110 in the respective first to 5760-th columns of a row scanned in the horizontal scanning period (H). Thus, in the following, a description will be given focusing on the pixel circuit 110 in the i-th row and the k-th column.

Note that in FIG. 15, of the scanning signals /Gwr(1) to /Gwr(1080), the scanning signals /Gwr(1) and /Gwr(2) in the region (a), the scanning signals /Gwr(i−1) and /Gwr(i) in the region (b) or (c), and the scanning signal /Gwr(1079) and /Gwr(1080) in the region (d) are illustrated. One of the scanning signals /Gwr(1) and /Gwr(2) is set to the primary, and another is set to the secondary, and thus, two rows are selected at the same time. Also for the scanning signals /Gwr(1079) and /Gwr(1080), one is set to the primary, and another is set to the secondary, and thus, two rows are selected at the same time.

For the scanning signals /Gwr(271) to /Gwr(810) in the regions (b) and (c), one row is selected alone, or two rows are selected at the same time, but the scanning signals /Gwr(i−1) or/Gwr(i) is illustrated to be selected alone.

In FIG. 15 and FIG. 16, a vertical scale indicating a voltage is not necessarily even for each signal.

In the electro-optical device 10, the horizontal scanning period (H) is divided into five periods of initialization periods (A), (B), (C), a compensation period (D), and a writing period (E) in a temporal order. Further, as for the operation of the pixel circuit 110, the light emission period (F) is further added to the five periods described above. The light emission period (F) in the i-th row is a period in which the control signal for light emission /Gel(i) is set to the M level, as described above or as illustrated in FIG. 16.

Of the initialization periods (A), (B), and (C), the initialization period (A) is a period for setting the transistor 121 to the off-state, and is a period for pre-preparation processing for the initialization period (C). The initialization period (B) is a period for a process for resetting a potential at the anode of the OLED 130, and the initialization period (C) is a period for applying a voltage to turn on the transistor 121 at a start of the compensation period (E), to the gate node g of the transistor 121.

In each horizontal scanning period (H), in the initialization period (A), the control signal /Gini is at the H level, the control signal Gorst is at the L level, the control signal /Drst is at the L level, the control signal Gref is at the H level, and the control signal Gcp is at the L level. Thus, the transistor 68 is in the off-state, the transistor 67 is in the off-state, the transistor 66 is in the on-state, the transmission gate 73 is in the on-state, and the transmission gate 72 is in the off-state.

In addition, in the initialization period (A) of the horizontal scanning period (H) in which the i-th row is selected, the scanning signal /Gwr(i) is at the L level, the control signal /Gcmp(i) is at the H level, and the control signal /Gel(i) is at the H level. Therefore, in the pixel circuit 110, the transistor 122 is in the on-state, and the transistors 123 and 124 are in the off-state.

Figure 17:
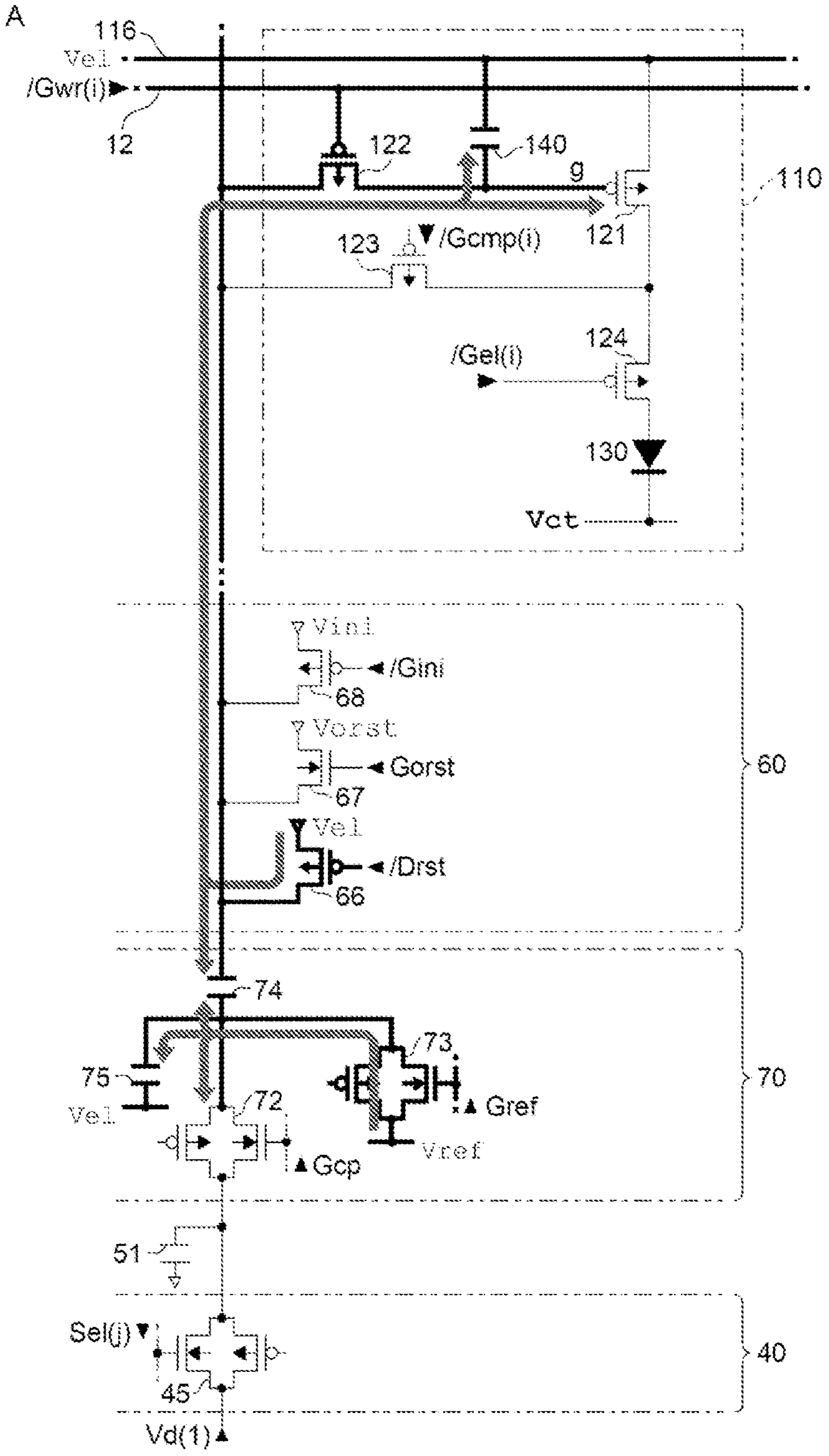
FIG. 17 is a diagram for explaining the operation of the electro-optical device.

Thus, in the initialization period (A), as illustrated in FIG. 17, the voltage Vref is applied via the transmission gate 73 to the one end of the capacitance element 74, the one end of the capacitance element 75, and the output end of the transmission gate 72. Additionally, in the pixel circuit 110, the voltage Vel passes through the transistor 66, the data line 14, and the transistor 122 in order, and is applied to one end of the capacitance element 140, and the gate node g of the transistor 121. When the voltage Vel is applied to gate node g, a voltage between the gate node and the source nodes is zero, thus the transistor 121 is forcibly brought into the off-state, and a current flowing through the OLED 130 is blocked. Furthermore, since the voltage Vel is applied to the other end of the capacitance element 74 via the data line 14, the capacitance element 74 is charged to a voltage |Vel−Vref|.

In each horizontal scanning period (H), in the initialization period (B), the control signal /Gini is at the H level, the control signal Gorst is set to the H level, the control signal /Drst is set to the H level, the control signal Gref is at the H level, and the control signal Gcp is at the L level. Thus, the transistor 68 is kept in the off-state, the transistor 67 is changed to be in the on-state, the transistor 66 is changed to be in the off-state, the transmission gate 73 is kept in the on-state, and the transmission gate 72 is kept in the off-state.

In addition, in the initialization period (B) of the horizontal scanning period (H) in which the i-th row is selected, the scanning signal /Gwr(i) is set to the H level, the control signal /Gcmp(i) is set to the L level, and the control signal /Gel(i) is set to the L level. Therefore, in the pixel circuit 110, the transistor 122 is brought into the off-state, and the transistors 123 and 124 are brought into the on-state.

Figure 18:
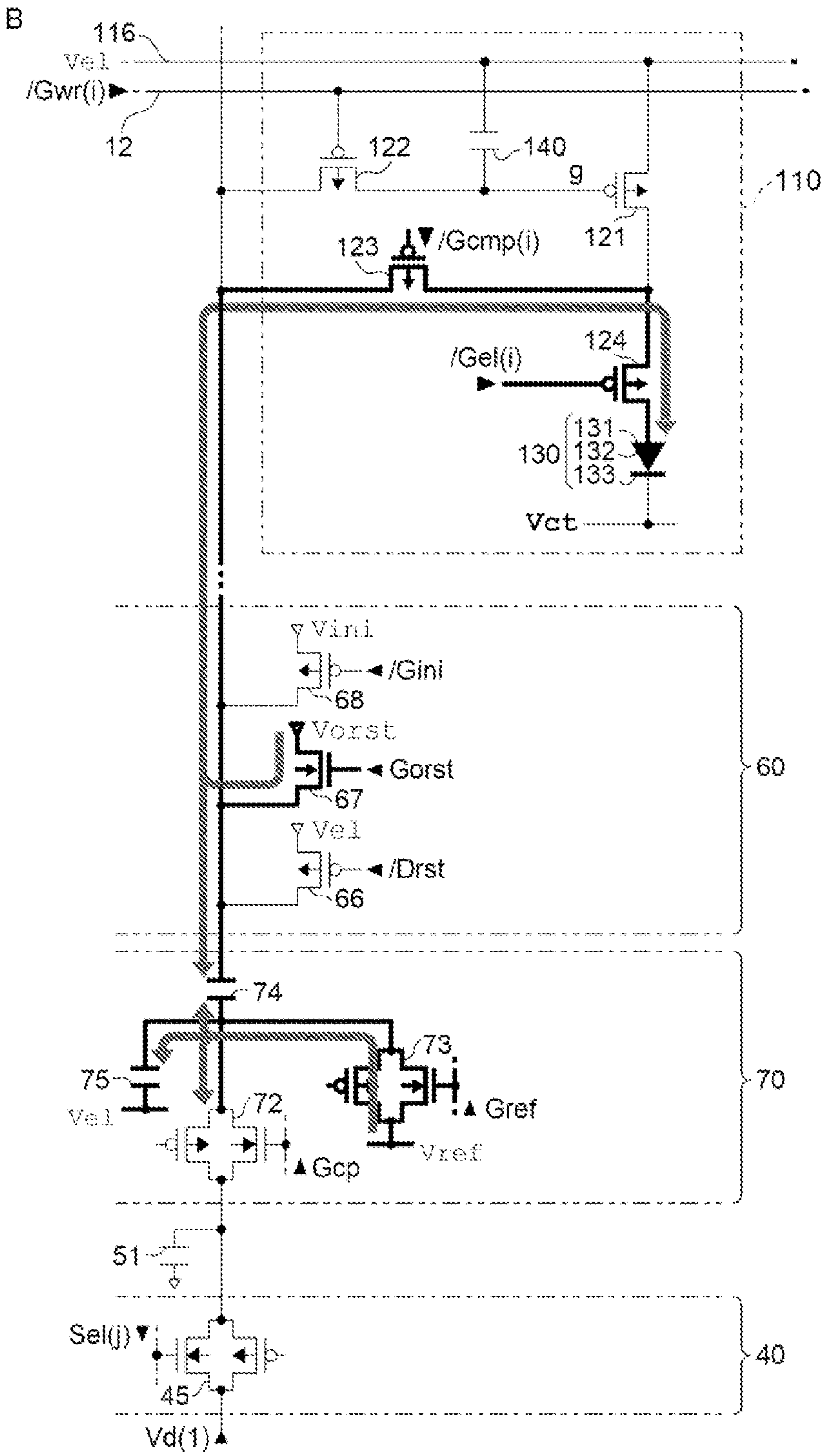
FIG. 18 is a diagram for explaining the operation of the electro-optical device.

Thus, in the initialization period (B), as illustrated in FIG. 18, the one end of the capacitance element 74, the one end of the capacitance element 75, and the output end of the transmission gate 72 are kept at the voltage Vref. Further, in the pixel circuit 110, the voltage Vorst passes through the transistor 67, the data line 14, the transistors 123 and 124 in order, and is applied to the pixel electrode 131, which is the anode of the OLED 130. In the OLED 130, the light emission function layer 132 is sandwiched between the pixel electrode 131 and the common electrode 133, and thus a capacitive component parasitizes. In the initialization period (B), a voltage held in the capacitive component, in particular, a voltage in accordance with a current flowing through the OLED 130 in the light emission period (F), is reset by application of the voltage Vorst to the pixel electrode 131. Note that, the voltage Vorst is a voltage that causes the OLED 130 not to emit light, and specifically, is zero volts corresponding to the L level, or a voltage close to the zero volts (0 to 1 Volt). Furthermore, since the voltage Vorst is applied to the other end of the capacitance element 74 via the data line 14, the capacitance element 74 is charged to a voltage |Vorst−Vref|.

In each horizontal scanning period (H), in the initialization period (C), the control signal /Gini is set to the L level, the control signal Gorst is set to the L level, the control signal /Drst is at the H level, the control signal Gref is at the H level, and the control signal Gcp is at the L level. Thus, the transistor 68 is changed to be in the on-state, the transistor 67 is changed to be in the off-state, the transistor 66 is kept in the off-state, the transmission gate 73 is kept in the on-state, and the transmission gate 72 is kept in the off-state.

In addition, in the initialization period (C) of the horizontal scanning period (H) in which the i-th row is selected, the scanning signal /Gwr(i) is set to the L level, the control signal /Gcmp(i) is set to the H level, and the control signal /Gel(i) is set to the H level. Therefore, in the pixel circuit 110, the transistor 122 is brought into the on-state, and the transistors 123 and 124 are brought into the off-state.

Figure 19:
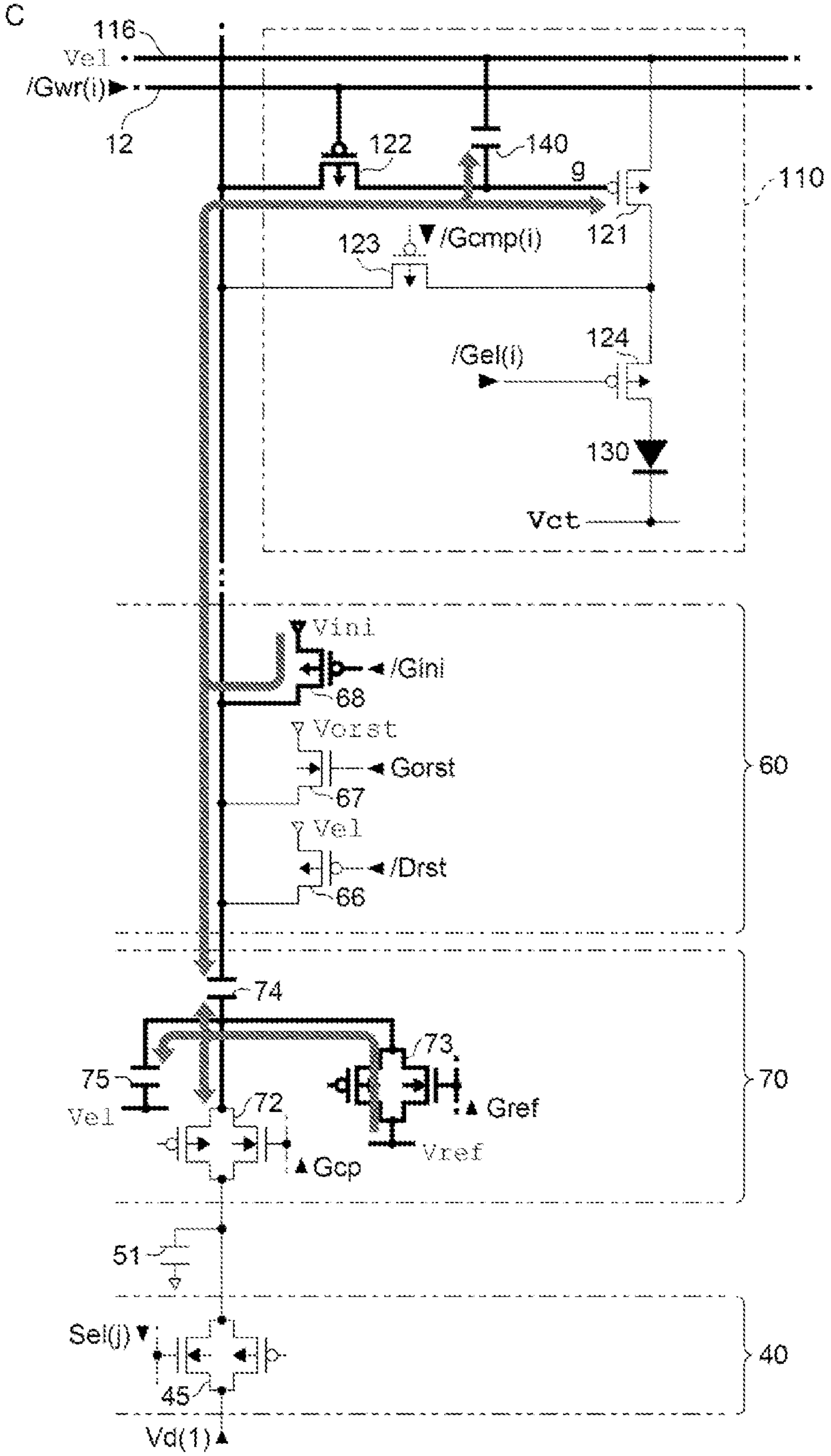
FIG. 19 is a diagram for explaining the operation of the electro-optical device.

Thus, in the initialization period (C), as illustrated in FIG. 19, the one end of the capacitance element 74, the one end of the capacitance element 75, and the output end of the transmission gate 72 are kept at the voltage Vref. Additionally, in the pixel circuit 110, the voltage *Vini* passes through the transistor 68, the data line 14, and the transistor 122 in order, and is applied to the one end of the capacitance element 140, and the gate node g of the transistor 121. Furthermore, since the voltage Vini is applied to the other end of the capacitance element 74 via the data line 14, the capacitance element 74 is charged to a voltage |Vini−Vref|.

In each horizontal scanning period (H), in the compensation period (D), the control signal /Gini is set to the H level, the control signal Gorst is at the L level, the control signal /Drst is at the H level, the control signal Gref is at the H level, and the control signal Gcp is at the L level. Thus, the transistor 68 is changed to be in the off-state, the transistor 67 is kept in the off-state, the transistor 66 is kept in the off-state, the transmission gate 73 is kept in the on-state, and the transmission gate 72 is kept in the off-state. In addition, in the compensation period (D) of the horizontal scanning period (H) in which the i-th row is selected, the scanning signal /Gwr(i) is kept at the L level, the control signal /Gcmp(i) is changed to be at the L level, and the control signal /Gel(i) is kept at the H level. Therefore, in the pixel circuit 110, the transistor 122 is kept in the on-state, the transistor 123 is brought into the on-state, and the transistor 124 is brought into the off-state.

Figure 20:
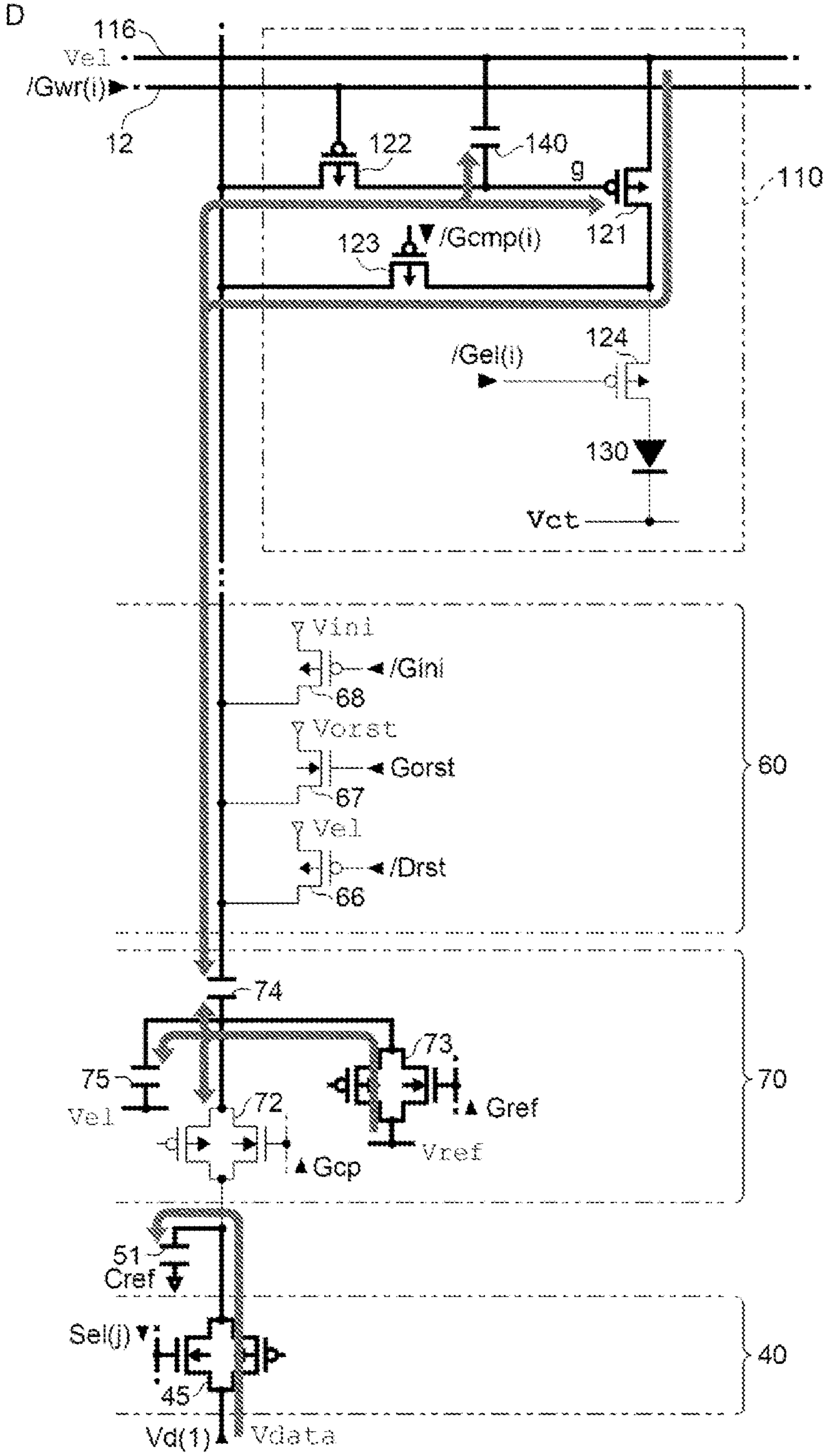
FIG. 20 is a diagram for explaining the operation of the electro-optical device.

Thus, in the compensation period (D), as illustrated in FIG. 20, the one end of the capacitance element 74, the one end of the capacitance element 75, and the output end of the transmission gate 72 are kept at the voltage Vref.

Since the one end of the capacitance element 140 is held at the voltage Vini in the immediately preceding initialization period (C), the pixel circuit 110 is brought into a state where a voltage (Vel−Vini) is held as the voltage between the gate node and the source node of the transistor 121.

In this state, when the transistor 123 is brought into the on-state, the transistor 121 is brought into a state where the gate node and the drain node are coupled, that is, a diode coupled state. Therefore, a voltage Vgs between the gate node and the source node in the transistor 121 converges to a threshold voltage of the transistor 121. Here, when the threshold voltage is conveniently denoted as Vth, a voltage of the gate node g of the transistor 121 converges to a voltage (Vel−Vth) corresponding to the threshold voltage Vth.

Note that, at a start of the compensation period (D), it is necessary that a current flows from the source node toward the drain node in the diode-coupled transistor 121. Thus, the voltage Vini applied to the gate node g in the initialization period (C) before the compensation period (D) is in a relationship of $Vini<Vel-Vth$.

Additionally, in the compensation period (D), the gate node g of the transistor 121 is coupled to the data line 14 via the transistor 122, and the drain node of the transistor 121 is coupled to the data line 14 via the transistor 123. Therefore, a voltage of each of the data line 14 and the other end of the capacitance element 74 also converges to the voltage (Vel−Vth). Therefore, the capacitance element 74 is charged to a voltage $|Vel-Vth-Vref|$.

On the other hand, in the compensation period (D), the control signals Sel(1) to Sel(1920) are sequentially and exclusively set to the H level. Note that, although omitted in FIG. 15, in the compensation period (D), the control signals /Sel(1) to /Sel(1920) are sequentially and exclusively set to the L level in synchronization with the control signals Sel(1) to Sel(1920), respectively.

Furthermore, when the control signal Sel(j) is set to the H level, for example, of the control signals Sel(1) to Sel(1920), the data signal output circuit 30 outputs, the data signals Vd(1) to Vd(3) of respective three pixels corresponding to an intersection of the scanning line 12 in the i-th row and the data line 14 belonging to the j-th group. In more detail, the data signal output circuit 30 outputs the data signal Vd(1) corresponding to a pixel in the i-th row and the (3j−2)-th column in a period where the control signal Sel(j) is set to the H level, outputs the data signal Vd(2) corresponding to a pixel in the i-th row and the (3j−1)-th column, and outputs the data signal Vd(3) corresponding to a pixel in the i-th row and the (3j)-th column.

As a specific example, when j is "2", the data signal output circuit 30 outputs the data signal Vd(1) corresponding to a pixel in the i-th row and a 4th column in a period where the control signal Sel(2) is set to the H level, and outputs the data signal Vd(2) corresponding to a pixel in the i-th row and a column, and outputs the data signal Vd(3) corresponding to a pixel in the i-th row and a 6th column.

When the control signals Sel(1) to Sel(1920) are sequentially and exclusively set to the H level, a voltage of a data signal corresponding to a pixel is held in each of the capacitance elements 51 corresponding to the first column to the 5760-th column.

Note that, FIG. 20 illustrates a state in which while the control signal Sel(j) corresponding to the j-th group to which the pixel circuit 110 belongs is set to the H level in the compensation period (D), and a voltage Vdata of the data signal Vd(1) is held in the capacitance element 51.

In each horizontal scanning period (H), in the writing period (D), the control signal /Gini is at the H level, the control signal Gorst is at the L level, the control signal /Drst is at the H level, the control signal Gref is set to the L level, and the control signal Gcp is set to the H level. Thus, the transistors 68, 67, and 66 are kept in the off-state, and the transmission gate 73 is changed to be in the off-state, and the transmission gate 72 is changed to be in the on-state. In addition, in the writing period (D) of the horizontal scanning period (H) in which the i-th row is selected, the scanning signal /Gwr(i) is kept at the L level, the control signal /Gcmp(i) is changed to be at the H level, and the control signal /Gel(i) is kept at the H level. Therefore, in the pixel circuit 110, the transistor 122 is in the on-state, and the transistors 123 and 124 are brought into the off-state.

Figure 21:
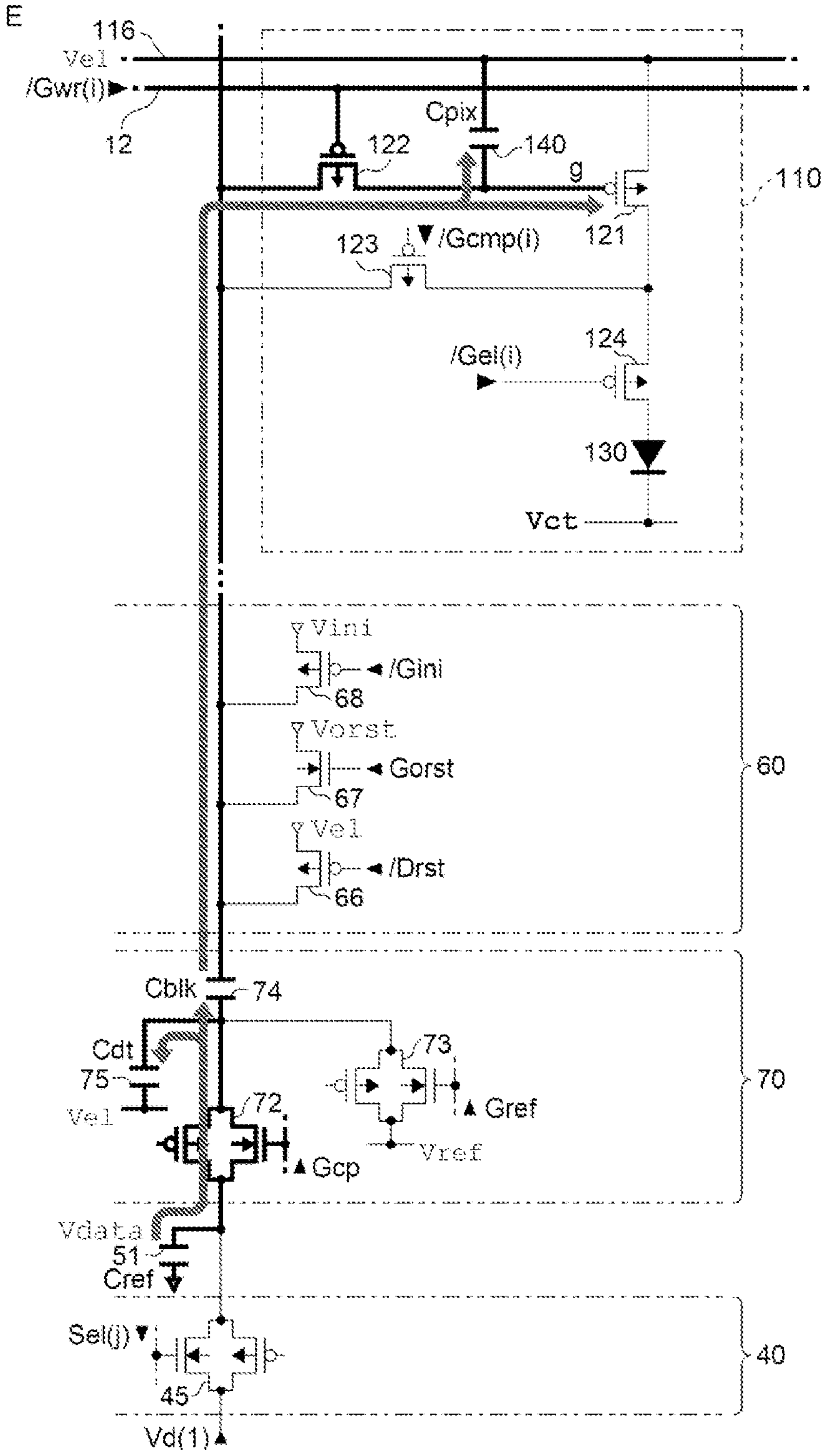
FIG. 21 is a diagram for explaining the operation of the electro-optical device.

Thus, in the writing period (E) of the horizontal scanning period (H) in which the i-th row is selected, as illustrated in FIG. 21, due to the off-state of the transmission gate 73, and the on-state of the transmission gate 72, a voltage of the one end of the capacitance element 74 is changed from the voltage Vref in accordance with the voltage held by the capacitance element 51. The voltage change passes through, via the capacitance element 74, the data line 14 and the transistor 122 in this order, and propagates to the gate node g. A voltage of the gate node g after the change is held in the capacitance element 140.

Note that, as illustrated in FIG. 21, a capacitor of the capacitance element 51 is denoted as Cref, a capacitor of the capacitance element 74 is denoted as Cblk, and a capacitor of the capacitance element 75 is denoted as Cdt, and a capacitor of the capacitance element 140 is denoted as Cpix.

Additionally, the voltage of the data signal Vd(1) held in the capacitance element 51 in the compensation period (D) is denoted as Vdata.

A voltage change amount ΔV of the gate node g from the compensation period (D) to the writing period (E) is expressed by Equation (1) below.

[Mathematical Equation 1]

$$
\begin{aligned}
\Delta V &= \frac{\frac{Cblk(Cdt+Cpix)}{Cblk+Cdt+Cpix}\times Vref + Cref\times Vdata}{\frac{Cblk(Cdt+Cpix)}{Cblk+Cdt+Cpix}\times(Vdata-Vref)} \\
&= \frac{Cref}{\frac{Cblk(Cdt+Cpix)}{Cblk+Cdt+Cpix}}\times(Vdata-Vref) \\
&= Ka\times(Vdata-Vref)
\end{aligned}
\tag{1}
$$

That is, as illustrated in Equation (1), a value of the gate node g changes to a value obtained by multiplying a voltage change amount (Vdata−Vref) at the one end of the capacitance element 74 by a coefficient Ka. Note that, the coefficient Ka is a coefficient less than "1", and is determined by the capacitors Cref, Cblk, Cdt, and Cpix. In other words, each of the capacitors Cref, Cblk, Cdt and Cpix is designed to have an appropriate value, to set the coefficient Ka to be less than "1". When the coefficient Ka is less than "1", voltage amplitude from a lowest value to a highest value of the voltage Vdata of a data signal is compressed in accordance with the coefficient Ka, and propagates to the gate node g.

When the pixel circuit 110 is miniaturized, a current flowing through the OLED 130 may change significantly for a very slight change in the voltage Vgs between the gate node and the source node of the transistor 121.

Even in this case, in the present exemplary embodiment, the voltage amplitude of the voltage Vdata of a data signal is compressed in accordance with the coefficient Ka, and propagates to the gate node g, and thus a current flowing through the OLED 130 can be controlled accurately.

Figure 22:
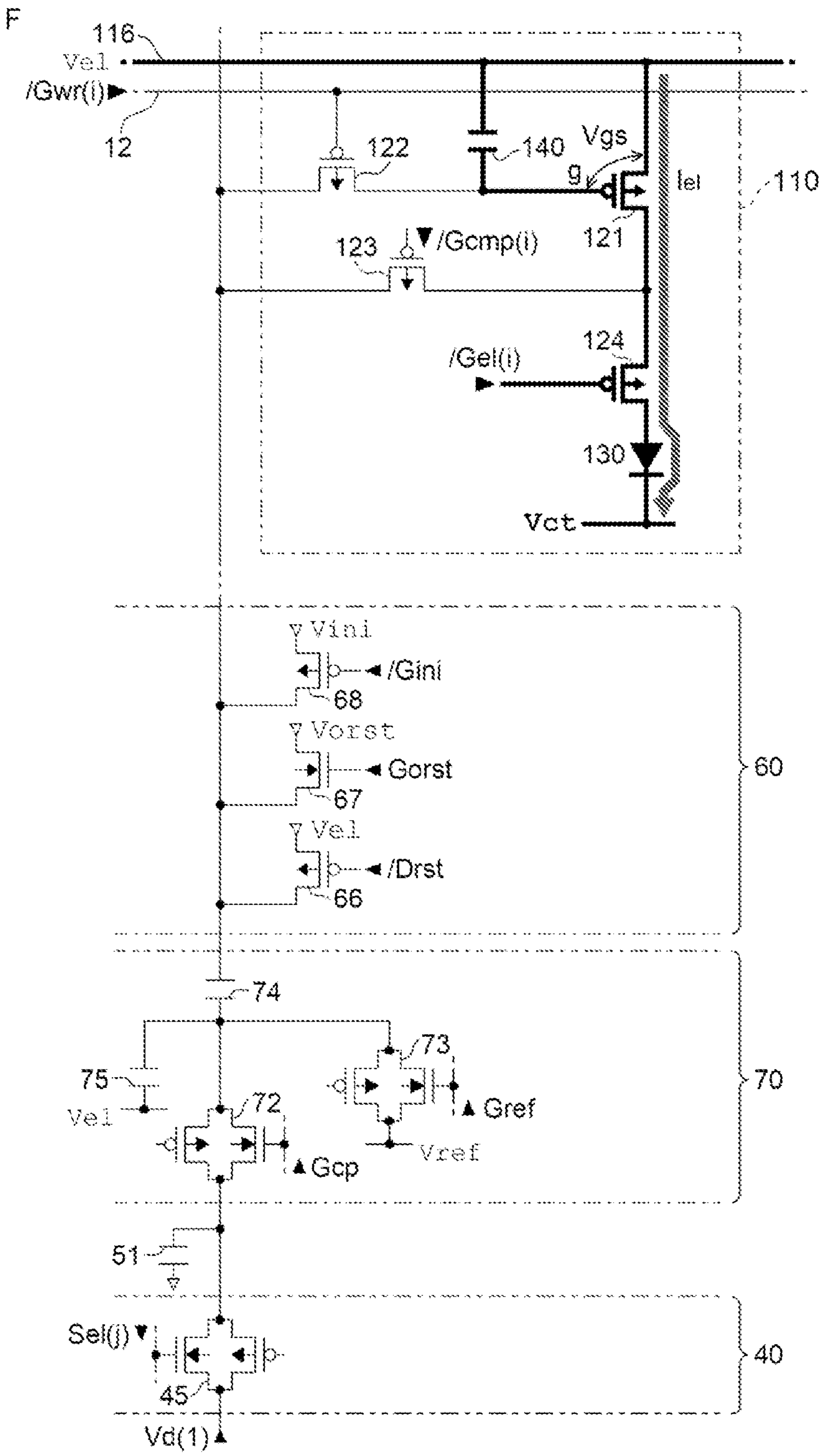
FIG. 22 is a diagram for explaining the operation of the electro-optical device.

After the writing period (E), the light emission period (F) follows. In other words, after selection of the scanning line 12 in the i-th row, the control signal /Gel(i) is set to the M level when the light emission period (F) is reached. Thus, as illustrated in FIG. 22, the transistor 121 causes a current Iel in accordance with the voltage Vgs, that is the current Iel limited by resistance between the source and the drain in transistor 124, to flow through OLED 130. Therefore, the OLED 130 is brought into an optical state of emitting light at brightness in accordance with the current Iel.

As illustrated in FIG. 10, such selection of the scanning line 12 is performed by each row in the regions (a), (b), (c), and (d) being set to the primary or secondary in the odd frame period and the even frame period.

Additionally, as illustrated in FIG. 14, for the light emission period (F), the selection of the scanning line 12 is performed by each row in the regions (a), (b), (c), and (d) being set to the primary or secondary in the odd frame period and the even frame period.

In the present exemplary embodiment, for example, as illustrated in FIG. 16, or as explained with reference to FIG. 14 described above, the two light emission periods (F) for the i-th row are set at approximately regular intervals in the odd frame period and the even frame period, and there are a total of the four light emission periods (F) from a viewpoint of the one period V (a period from the top image to the bottom image) of a vertical synchronization signal of 45 Hz. Specifically, a non-light emission period in which the control signal /Gel(i) is set to the H level is appropriately inserted, to configure the non-light emission period and the light emission period (F) to be alternately repeated.

In the present exemplary embodiment, the configuration is adopted in which the amplitude of the voltage Vdata of a data signal output from the data signal output circuit 30 is compressed by interposing the capacitance element 74 to supply the amplitude to the gate node g in the pixel circuit 110.

On the other hand, in the present exemplary embodiment, the configuration is adopted in which in the compensation period (D), the threshold voltage Vth of the transistor 121 is compensated.

Next, usefulness of the compensation period (D) will be described. Note that in describing this usefulness, in order to avoid complicated equations, a case is assumed in which a compression ratio of the voltage Vdata of a data signal is "1", that is, a case is assumed in which the voltage Vdata of a data signal is supplied to the data line 14 as is in the writing period (E) after the compensation period (D). Further, it is assumed that in the light emission period (F), when the L level, rather than the M level, is applied to the gate node of the transistor 124, and the transistor 124 is brought into the on-state, resistance between the source node and the drain node is ideally zero.

First, the current Iel flowing through the OLED 130 in the light emission period (F) can be expressed as in Equation (2) below.

[Mathematical Equation 2]

$$Iel=k_1(Vgs-Vth)^2 \quad (2)$$

Note that, a coefficient k1 in Equation (2) is expressed by the following Equation (3).

[Mathematical Equation 3]

$$k_1=(W/2L)\cdot\mu Cox \quad (3)$$

In Equation (3), W is a channel width of the transistor 121, L is a channel length of the transistor 121, μ is mobility of a carrier, and Cox is a capacitor per unit area of a (gate) oxide film in the transistor 121.

In a configuration in which the voltage Vdata of a data signal is not compressed, and the threshold voltage of the transistor 121 is not compensated, when the voltage Vdata of a data signal is applied directly to the gate node g of the transistor 121, the voltage Vgs between the gate node and the source node of the transistor 121 can be expressed as in Equation (4) below.

[Mathematical Equation 4]

$$Vgs=|Vel-V\text{data}| \quad (4)$$

At this time, the current Iel flowing through the OLED 130 can be expressed as in Equation (5) below.

[Mathematical Equation 5]

$$Iel=k_1(Vgs-Vth)^2$$

$$=k_1(Vel-V\text{data}-Vth)^2 \quad (5)$$

As expressed in Equation (5), the current Iel is influenced by the threshold voltage Vth. Here, due to a semiconductor process, a variation of the threshold voltage Vth in the transistor 121 is in a range from several mV to several tens of mV. When the threshold voltage Vth in the transistor 121 varies in a range from several mV to several tens of mV, there is a possibility that a maximum of 40% difference in the current Iel may be generated between the adjacent pixel circuits 110.

Current-brightness characteristics in the OLED 130 are generally linear. Therefore, in a configuration that does not compensate for the threshold voltage Vth, even when a data signal of the same voltage Vdata is supplied to each of the two pixel circuits 110 in order to cause the two OLEDs 130 to emit light at the same brightness, currents flowing through the respective OLEDs 130 are actually different. Therefore, in a configuration that does not compensate for the threshold voltage Vth, the brightness is varied, and display quality will be significantly impaired. Therefore, in the present exemplary embodiment, the configuration is adopted in which the threshold voltage Vth compensation is performed only in a row set to the primary, and by switching the primary and secondary setting between the odd frame and the even frame, the threshold voltage Vth compensation is performed at least in one frame of either the odd frame or the even frame.

When a voltage of the gate node g in the transistor 121 is caused to converge to the voltage (Vel−Vth) in the compensation period (D), and then the gate node g is caused to change to have the voltage Vdata, the voltage Vgs between the gate node and the source node of the transistor 121 can be expressed as in Equation (6) below.

[Mathematical Equation 6]

$$Vgs=Vth-k_2(V\text{data}-V\text{ref}) \quad (6)$$

Note that, a coefficient k2 in Equation (6) is a coefficient determined by the capacitors Cblk and Cpix in a configuration in which the voltage Vdata of a data signal is not compressed (configuration without the capacitance element 74).

When the voltage Vgs is expressed as in Equation (6), the current Iel flowing through the OLED 130 can be expressed as in Equation (7) below.

[Mathematical Equation 7]

$$Iel=k_1\{Vth-k_2(V\text{data}-V\text{ref})-Vth\}^2$$

$$=k_1k_2(V\text{ref}-V\text{data})^2 \quad (7)$$

In Equation (7), the term of the threshold voltage Vth is removed, and the current Iel is determined by the voltage Vdata of a data signal. This makes it possible to suppress a reduction in display quality due to the threshold voltage Vth of the transistor 121.

Note that, in the exemplary embodiment, actually as illustrated in Equation (1), the voltage amplitude from the lowest value to the highest value of the voltage Vdata of a data signal is compressed in accordance with the coefficient Ka, and propagates to the gate node g.

Further, in the present exemplary embodiment, the M level is supplied to the gate node of the transistor 124 in the light emission period (F) to limit the current Iel, but the reduction in display quality due to the threshold voltage Vth is still suppressed.

Next, in the present exemplary embodiment, usefulness of applying the M level to the gate node of the transistor 124 in the light emission period (F) will be described.

The reason for applying the M level to the gate node of the transistor 124 is to maintain a constant current property by the transistor 121, regardless of a change in current voltage characteristics over time in the OLED 130, by causing the transistor 124 to operate in a saturation region.

In particular, when the current Iel flows, the OLED 130 emits light at brightness in accordance with the current Iel. In the present exemplary embodiment, in the pixel circuit 110, the voltage of the gate node g in the transistor 121 is held by the capacitance element 140, so that the constant current property of the current Iel flowing from the power supplying line 116 to the OLED 130 is ensured.

However, the OLED 130 has characteristics that element characteristics change due to a lapse of light emission time and that a potential of the anode (pixel electrode 131) required to flow a constant current gradually increases. When the potential of the anode in the OLED 130 increases, an equilibrium point of potential in a path from the power supplying line 116 to the common electrode 133 changes, and a potential of the source node of the transistor 124, that is the drain node of the transistor 121, increases. When the potential of the drain node of the transistor 121 increases, the voltage between the source node and the drain node in the transistor 121 also varies, and the current flowing through the drain node of the transistor 121 also varies, and as a result, the constant current property of the OLED 130 is impaired.

Therefore, in the present exemplary embodiment, the transistor 124 is caused to operate in the saturation region as a countermeasure for the impaired constant current property in association with the change over time in the element characteristics of the OLED 130.

When the transistor 124 is caused to operate in the saturation region, even when the potential of the anode in the OLED 130 is changed, it is the transistor 124 that is directly affected. The transistor 121 is affected by the potential variation in the drain node of the transistor 124, but a variation in a drain current in the saturation region is small. Thus, influence by the variation in the drain potential in the transistor 121 coupled to the transistor 124, and thus by a variation in a gate potential due to current leak is mitigated.

In the first exemplary embodiment, a data amount in the Y direction of the video data Vid supplied from the host device 250 to the electro-optical device 10 is reduced. Furthermore, a data amount in the X direction can also be reduced by the following technique.

Figure 23:
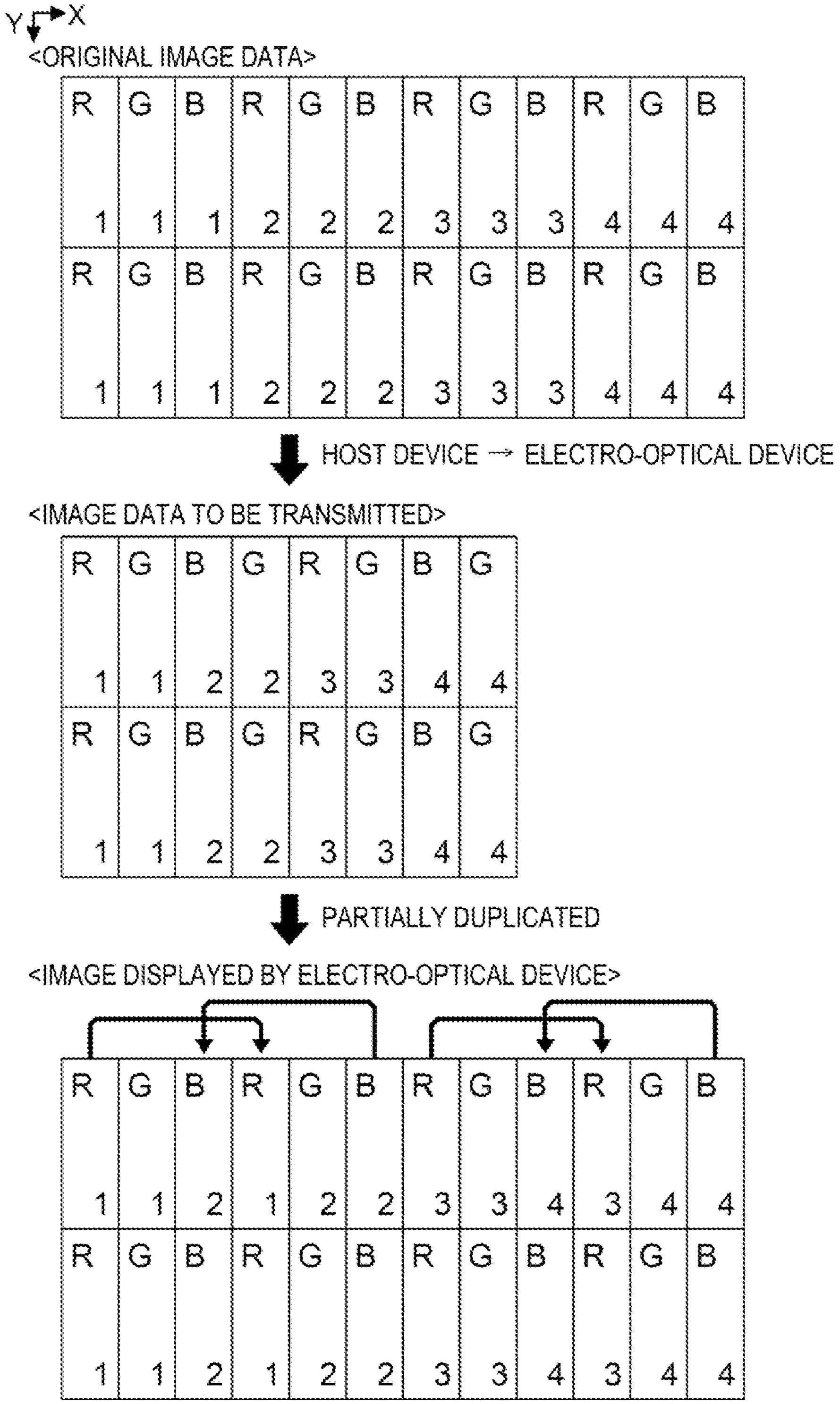
FIG. 23 is a diagram for explaining a reduction in video data in an X direction in a modified example of the first exemplary embodiment.

FIG. 23 is a diagram for explaining the reduction in data amount in the X direction.

Note that in FIG. 23, for the sake of simplicity of description, when RGB correspond to one dot, vertical two dots by horizontal four dots are extracted from a matrix array. Note that, a number in a lower side in a square frame indicates a dot number in the X direction of an original image. For example, R3 means an R component belonging to a third dot in the X direction.

When the original image data is illustrated by the vertical two dots by the horizontal four dots (RGB) as described above, the host device 250 reduces R components for two dots among four dots, does not reduce a G component, and reduces B components for the two dots among the four dots, and supplies image data to the electro-optical device 10.

The electro-optical device 10, for the image data of the reduced R and B components, reproduces the image data of the reduced color components, by duplicating the same color component for adjacent dots, as illustrated in a lower section of the figure. For example, R2 reduced from the original image data is reproduced by replicating R1 that was not reduced.

In consideration of contribution (visibility) in brightness of each color in RGB, R:3, G:6, and B:1 are defined. "10" (=3+6+1) before the data reduction becomes "8" (=1.5+6+0.5) after the data reduction.

In the reduction as described above, RGBRGBRGBRGB becomes RGBGRGBG, image quality becomes ⅔, but in view of the contribution described above, the image quality becomes ⅘. In the present exemplary embodiment, since the image quality in the Y direction becomes ⅔, considering that the image quality in the X direction becomes ⅘, image quality in XY directions becomes $8/15$ (=⅔×⅘), which is better than half the image quality.

According to the reduction in the Y direction only, driving can be performed at a vertical synchronization frequency of 45 Hz, when the reduction is further performed in the X direction, one horizontal scanning period is shortened, and thus driving can be performed at 67.5 Hz, which is 3/2 times. 45 Hz is for the one cycle V throughout an odd frame and an even frame, so that in either subframe, driving is performed at 135 Hz, which is twice.

Note that in such driving, when vertical line drawing and character are caused to be displayed, a line diagram or the like may be discolored and visually recognized, but such a display is a still image, thus it is sufficient that driving is performed by a method that does not reduce data.

Second Exemplary Embodiment

Next, the electro-optical device 10 according to a second exemplary embodiment will be described. Note that in the second exemplary embodiment, the configuration of the electro-optical device 10 is the same as that of the first exemplary embodiment, and resolution that can be expressed in a color image is 1080 dots by 1920 dots. Additionally, in the second exemplary embodiment, the display region 100 of the electro-optical device 10 need not be divided into the regions (a), (b), (c), and (d).

Figure 24:
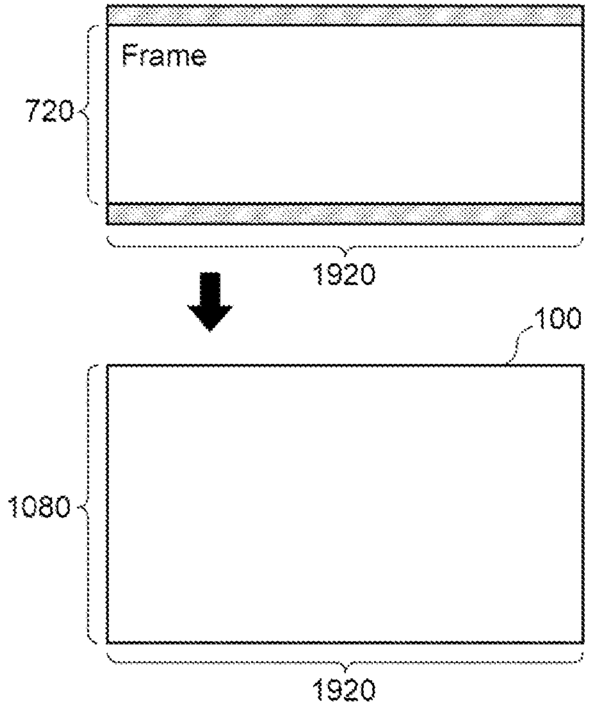
FIG. 24 is an explanatory diagram of video data supplied to an electro-optical device from a host device in a second exemplary embodiment.

FIG. 24 is an explanatory diagram of video data supplied to the electro-optical device 10 from the host device 250 in the second exemplary embodiment.

As illustrated in this figure, in the second exemplary embodiment, the host device 250 supplies an image of vertical 720 lines to the electro-optical device 10 in the present exemplary embodiment. However, the electro-optical device 10 includes the vertical 1080 rows, it is necessary to perform 1.5 times extension in the vertical direction.

Figure 25:
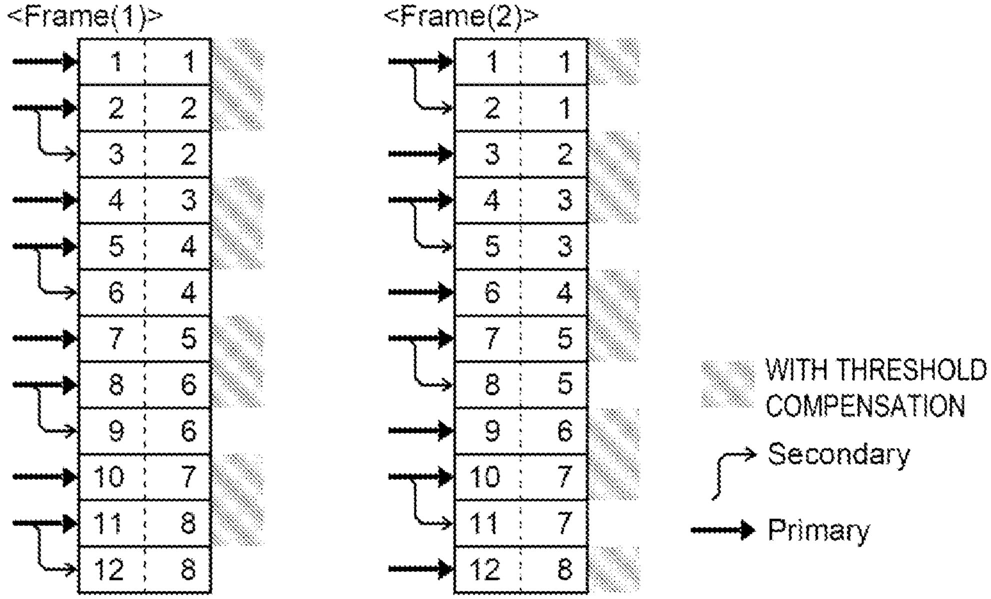

Thus, in the second exemplary embodiment, as illustrated in FIG. 25, in a certain frame period, single row selection and two-row simultaneous selection are repeated every three rows. In other words, in the single row selection, a selected row is set to the primary, in the two-row simultaneous selection, one row is set to the primary, and another is set to the secondary.

In the next frame period, the row previously selected in the single row selection is set to the primary in the two-row simultaneous selection, the row previously set to the primary in the two-row simultaneous selection is set to the secondary in the two-row simultaneous selection, and the row previously set to the secondary in the two-row simultaneous selection is set to the primary in the single row selection.

Note that, as illustrated in FIG. 25, threshold compensation is performed in the row set to the primary, and is not performed in the row set to the secondary.

In such driving, when the image illustrated in FIG. 24 is displayed in two frames in the electro-optical device 10, transfer of the video data Vid can be completed at 30 Hz, thus power consumption can be suppressed. For example, the display for one frame at 60 Hz can be displayed in one frame at 30 Hz. Since data transfer amount is halved, it is possible to reduce logic current consumption, and, a parallel number in a high-speed I/F can be reduced to ½, for example, from 8 to 4. That is, the power consumption can be reduced.

Figure 26:
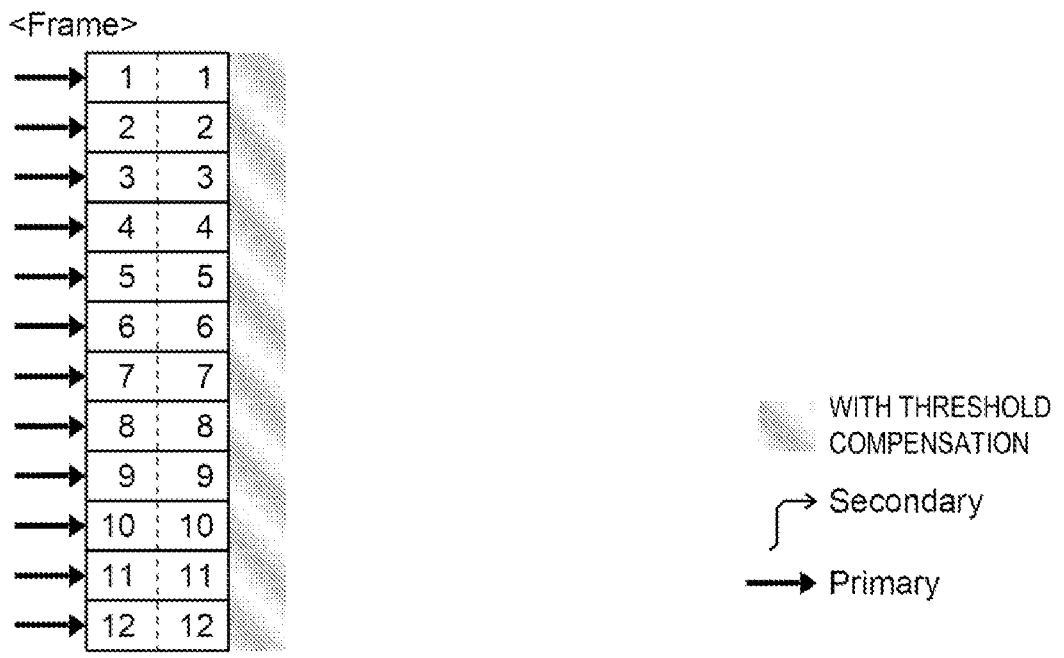

In this manner, in the electro-optical device 10, the driving in the first exemplary embodiment and the second exemplary embodiment can be performed in accordance with the video data Vid supplied from the host device 250. In addition, as illustrated in FIG. 26, by setting all the 1st to 1080-th lines of the video data Vid illustrated in the upper section of FIG. 7 to the primary, it is possible to perform driving without deterioration.

Even when these driving methods are caused to be changed, power consumption does not increase, thus, for example, it is easy to selectively use the driving methods, when displaying is desirably performed at a high frame rate for applications such as games, and when a high frame rate is not needed for a still image or the like.

In addition, in the exemplary embodiments and the like, the OLED 130 has been illustrated as an example of the display element, but other display elements may be used. For example, LEDs, mini LEDs, micro LEDs, or the like may be used as the display element. An optical state in a pixel circuit refers to a state in which these display elements emit light at brightness corresponding to a voltage of a data signal.

The channel type of each of the transistors 121, 122, 123, and 124 is not limited to the exemplary embodiments and the like. Further, these transistors may also be replaced with transmission gates as appropriate except for the transistor 121.

Additionally, the transmission gates 45, 72, and 73 may also be replaced with one-sided channel transistors.

Electronic Apparatus

Next, an electronic apparatus to which the electro-optical device 10 according to the above-described exemplary embodiments is applied will be described. The electro-optical device 10 is suitable for application with a small pixel and high definition display. In this regards, a head-mounted display will be described as an example of the electronic apparatus.

Figure 27:
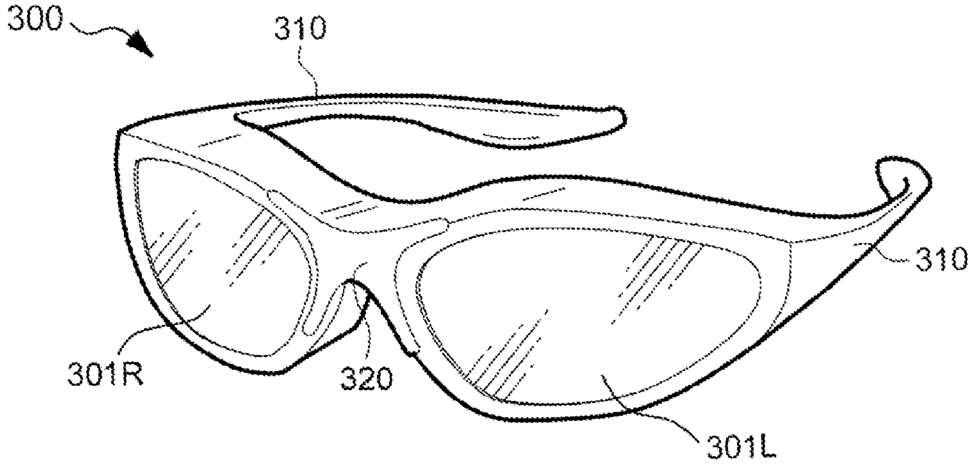
FIG. 27 is a perspective view illustrating a head-mounted display in which an electro-optical device is used.
Figure 28:
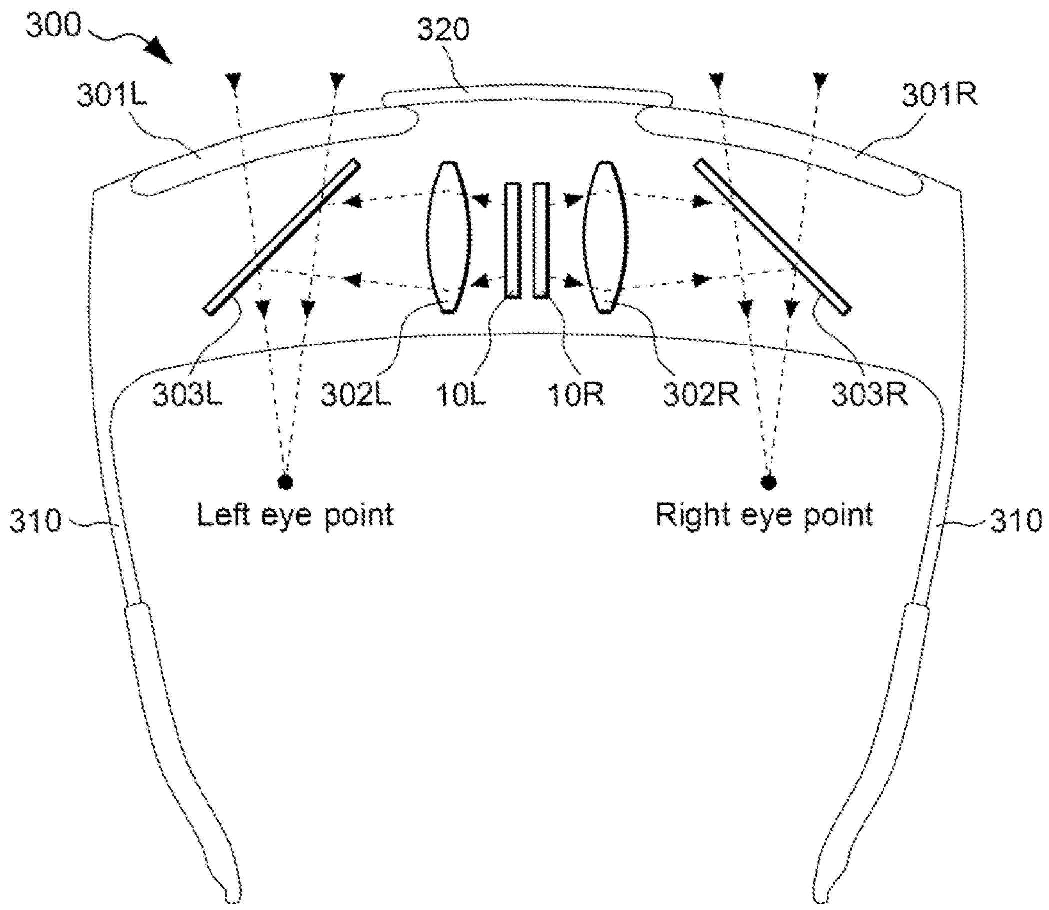
FIG. 28 is a diagram illustrating an optical configuration of the head-mounted display.

FIG. 27 is a diagram illustrating appearance of a head-mounted display, and FIG. 28 is a diagram illustrating an optical configuration of the head-mounted display.

First, as illustrated in FIG. 27, a head-mounted display 300 includes, in terms of appearance, temples 310, a bridge 320, and lenses 301L and 301R, as with typical eye glasses. In addition, as illustrated in FIG. 28, the head-mounted display 300 is provided with an electro-optical device for a left eye and an electro-optical device 10R for a right eye in the vicinity of the bridge 320 and on the back side (the lower side in the figure) of the lenses 301L and 301R.

An image display surface of the electro-optical device is disposed to be on the left side in FIG. 28. According to this configuration, a display image by the electro-optical device 10L is output via an optical lens 302L in a 9-o'clock direction in the figure. A half mirror 303L reflects the display image by the electro-optical device 10L in a 6-o'clock direction, while the half mirror 303L transmits light entering in a 12-o'clock direction. An image display surface of the electro-optical device 10R is disposed on the right side opposite to the electro-optical device 10L. According to this configuration, a display image by the electro-optical device 10R is emitted via an optical lens 302R in a 3-o'clock direction in the figure. A half mirror 303R reflects the display image by the electro-optical device 10R in the 6-o'clock direction, while the half the mirror 303R transmits light entering in the 12-o'clock direction.

In this configuration, a wearer of the head-mounted display 300 can observe the display images by the electro-optical devices 10L and 10R in a see-through state in which the display images by the electro-optical devices 10L and 10R overlap with the outside.

In addition, in the head-mounted display 300, of images for both eyes with parallax, an image for a left eye is displayed on the electro-optical device 10L, and an image for a right eye is displayed on the electro-optical device 10R, and thus, it is possible to cause a wearer to sense the displayed images as an image displayed having a depth or a three dimensional effect.

Note that, in addition to the head-mounted display 300, an electronic apparatus including the electro-optical device 10 can be applied to an electronic viewing finder in a video camera, a lens-exchangeable digital camera, and the like, a personal digital assistant, a watch display, a light valve of a projection type projector, or the like.

APPENDICES

Preferred aspects of the present disclosure will be understood as in the following from the above description, for example. Note that, in order to facilitate understanding of each of the aspects, in the following, the reference signs of the figures will also be denoted in parentheses for convenience, but the present disclosure is not intended to be limited to the illustrated aspects.

Appendix 1

An electro-optical device (10) according to an aspect (Aspect 1) includes a first scanning line (12) disposed in an i-th row in a display region (100), a first pixel circuit (110) provided corresponding to the first scanning line (12) and a first data line (14) provided in a k-th column in the display region (100), and brought into an optical state in accordance with a voltage of the first data line (14) when the first scanning line (12) is selected, a second scanning line (12) disposed in an (i+1)-th row in the display region (100), and a second pixel circuit (110) provided corresponding to the second scanning line (12) and the first data line (14), and brought into an optical state in accordance with a voltage of the first data line when the second scanning line (14) is selected, wherein i and k are integers, of a first subframe period (odd frame period) of a frame period (V), in a period in which the first scanning line (12) and the second scanning line (12) are selected, a data signal of a voltage corresponding to an i-th row and k-th column of first image data (data of a top image) in the first subframe period (odd frame period) is output, and of a second subframe period (even frame period) of the frame period (V), in a period in which the first scanning line (12) and the second scanning line (12) are selected, a data signal of a voltage corresponding to an (i+1)-th row and the k-th column of second image data (data of a bottom image) in the second subframe period (even frame period) is output.

According to Aspect 1, since one scanning line is sufficient for one row, wiring in the display region in which the pixel circuits are arrayed can be avoided from being complicated. Displaying can be performed at a high frame rate while maintaining resolution.

Note that, the scanning line 12 in the i-th row is an example of the first scanning line, and the scanning line 12 in the (i+1)-th row is an example of the second scanning line, and the data line 14 in the k-th column is an example of the first data line. In addition, the pixel circuit 110 in the i-th row and j-th column is an example of the first pixel circuit, and the pixel circuit 110 in the (i+1)-th row and the j-th column is an example of the second pixel circuit. A period of one cycle specified by a vertical synchronization signal is an example of the frame period, and the odd frame period is an example of the first subframe period, and the even frame period is an example of the second subframe period. The top image is an example of the first image, and the bottom image is an example of the second image.

Appendix 2

The electro-optical device (10) according to a specific aspect (Aspect 2) of Aspect 1 includes a scanning line drive circuit (120) configured to supply a scanning signal to the first scanning line (12) and the second scanning line (12), wherein the scanning line drive circuit (120) includes a first holding unit (Me1) holding information for setting each of the first scanning line (12) and the second scanning line (12) to a primary or a secondary, and when information for specifying selection of the scanning line (12) set to the primary is supplied, supplies the primary scanning line (12) with a scanning signal indicating that the primary scanning line (12) is to be selected, and supplies the scanning line (12) set to the secondary with a scanning signal indicating that the scanning line (12) set to the secondary is to be selected.

According to Aspect 2, single row selection or two-row simultaneous selection in the scanning line (12) can be realized by setting the primary and the secondary.

Appendix 3

In the electro-optical device (10) according to a specific aspect (Aspect 3) of Aspect 2, each of the first pixel circuit (110) and the second pixel circuit (110) includes a first transistor (121), a second transistor (122), a third transistor (123), a fourth transistor (124), and a display element (130), the first transistor (121) includes a gate node, a source node, and a drain node, and causes a current in accordance with a voltage between the gate node and the source node to flow to the display element (130) via the fourth transistor (124), the second transistor (122) is provided between the first data line and the gate node of the first transistor, and brought into an on-state or an off-state in accordance with selection or non-selection of a scanning line, the third transistor (123) is provided between the data line (14) and the drain node of the first transistor (121), and the fourth transistor (124) is provided between the drain node of the first transistor (121) and the display element (130), in the first subframe period (odd frame period), there is a period in which the gate node and the drain node of the first transistor (121) in the first pixel circuit (110) are electrically coupled, there is not a period in which the gate node and the drain node of the first transistor (121) in the second pixel circuit (110) are electrically coupled, and in the second subframe period (even frame period), there is not a period in which the gate node and the drain node of the first transistor (121) in the first pixel circuit (110) are electrically coupled, and there is a period in which the gate node and the drain node of the first transistor (121) in the second pixel circuit (110) are electrically coupled.

According to Aspect 3, threshold compensation for the first transistor (121) is appropriately performed. Note that, the transistor 121 is an example of the first transistor, the transistor 122 is an example of the second transistor, the transistor 123 is an example of the third transistor, and the transistor 124 is an example of the fourth transistor.

Appendix 4

In the electro-optical device (10) according to a specific aspect (Aspect 4) of Aspect 3, the fourth transistor (124) of the first pixel circuit (110) is controlled to be in the on-state by selection of the first light emission control line (118), the fourth transistor (124) of the second pixel circuit (110) is controlled to be in the on-state by selection of the second light emission control line (118), the scanning line drive circuit (120) includes a second holding unit (Me2) holding information for setting each of the first light emission control line (118) and the second light emission control line (118) to the primary or the secondary, supplies a light emission control signal to the first light emission control line (118) and the second light emission control line (118), and when information specifying selection of the light emission control line (118) set to the primary is supplied, supplies the primary light emission control line (118) with a light emission control signal indicating that the primary light emission control line (118) is to be selected, and supplies the light emission control line (118) set to the secondary with a light emission control signal indicating that the light emission control line (118) set to the secondary is selected.

According to Aspect 4, single row selection or two-row simultaneous selection in the light emission control line (118) can be realized by setting the primary and the secondary. Note that, the light emission control line 118 in the i-th row is an example of the first light emission control line, and the light emission control line 118 in the (i+1)-th row is an example of the second light emission control line.

Appendix 5

The electro-optical device (10) according to a specific aspect (Aspect 5) of Aspect 4 includes a third pixel circuit (110) provided corresponding to a third scanning line (112) and the first data line (14), and a fourth pixel circuit (110) provided corresponding to a fourth scanning line (12) and the first data line (14), the first scanning line to the fourth scanning line are arrayed in this order, in the first subframe period (odd frame period), the first scanning line (12) and the third scanning line (12) are set to the primary, in a period in which the third scanning line (12) and the fourth scanning line (14) are selected, a data signal of a voltage corresponding to an (i+2)-th row and the k-th column of the first image data (data of the top image) is output, in the second subframe period (even frame period), the second scanning line (12) and the fourth scanning line (12) are set to the primary, and in a period in which the third scanning line (12) and the fourth scanning line (12) are selected, a data signal of a voltage corresponding to an (i+3)-th row and the k-th column of the second image (bottom image) data is output.

According to Aspect 5, in the first subframe period (odd frame period) and the second subframe period (even frame period), the primary and secondary are switched in the third scanning line (12) and the fourth scanning line (12).

Note that, the scanning line 12 in the (i+2)-th row is an example of the third scan line, and the scanning line 12 in the (i+3)-th row is an example of the fourth scan line. Additionally, the pixel circuit 110 in the (i+2)-th row and the j-th column is an example of the third pixel circuit, and the pixel circuit 110 in the (i+3)-th row and the j-th columns is an example of the fourth pixel circuit.

Appendix 6

In the electro-optical device (10) according to a specific aspect (Aspect 6) of Aspect 5, a fourth transistor (124) of the third pixel circuit (110) is controlled to be in the on-state by selection of a third light emission control line (118), and a fourth transistor (124) of the fourth pixel circuit (110) is controlled to be in the on-state by selection of a fourth light emission control line (118), and after one of the first light emission control line (118) and the second light emission control line (118) is set to the primary, and another is set to the secondary, one of the third light emission control line (118) and the fourth light emission control line (118) is set to the primary, and another is set to the secondary.

Appendix 7

In the electro-optical device (10) according to a specific aspect (Aspect 7) of Aspect 6, the display region (100) includes a first region (a) and a second region (b) separated in a direction along the first scanning line (12), the second region (b) being positioned closer to a center than the first region (a), and, in the second region (b), a fifth pixel circuit (110) provided corresponding to a fifth scanning line (12) and the first data line (14), a sixth pixel circuit (110) provided corresponding to a sixth scanning line (12) and the first data line (14), a seventh pixel circuit (110) provided corresponding to a seventh scanning line (12) and the first data line (14), an eighth pixel circuit (110) provided corresponding to an eighth scanning line (12) and the first data line (14), a ninth pixel circuit (110) provided corresponding to a ninth scanning line (12) and the first data line (14), and a tenth pixel circuit (110) provided corresponding to a tenth scanning line (12) and the first data line (14), are included, the first scanning line to the tenth scanning line are arrayed in this order, in the first subframe period (odd frame period), the fifth scanning line (12), the sixth scanning line (12), the seventh scanning line (12), the ninth scanning line (12), and the tenth scanning line (12) are set to the primary, the eighth scanning line (12) is set to the secondary of the seventh scanning line (12), and in the second subframe period (even frame period), the fifth scanning line (12), the sixth scanning line (12), the eighth scanning line (12), the ninth scanning line (12), and the tenth scanning line (12) are set to the primary, and the seventh scanning line (12) is set to the secondary of the eighth scanning line (12).

According to Aspect 7, resolution in the second region is improved compared to the first region. Additionally, in the first subframe period (odd frame period) and the second subframe period (even frame period), the primary and secondary are switched in the seventh scanning line (12) and the eighth scanning line (12). Note that, the region (a) is an example of the first region, and the region (b) is an example of the second region. The scanning lines 12 in the respective first to sixth rows in the region (b) are an example of the fifth to tenth scanning lines.

Appendix 8

The electro-optical device (10) according to a specific aspect (Aspect 8) of Aspect 7 includes an eleventh pixel circuit (110) provided corresponding to the first scanning line (12), and a second data line (12) different from the first data line (12), in the first subframe period (odd frame period), in a period in which the first scanning line (12) is selected, a data signal of a voltage corresponding to the i-th row and the k-th column of the first image data (data of the top image) is output to the second data line (12), and in the second subframe period (even frame period), in a period in which the second scanning line (12) is selected, a data signal of a voltage corresponding to the (i+1)-th row and the k-th column of the second image (bottom image) data is output to the second data line (14).

According to Aspect 8, a data signal supplied to a data line is also compressed, and thus a data amount can be further reduced. Note that, the data line 14 of R or B belonging to an even column dot is an example of the second data line.

Appendix 9

An electronic apparatus according to Aspect 9 includes the electro-optical device according to any one of Aspects 1 to 8.

What is claimed is:

1. An electro-optical device, comprising:

a first scanning line disposed in an i-th row in a display region;

a first pixel circuit provided corresponding to the first scanning line and a first data line provided in a k-th column in the display region, and configured to be brought into an optical state in accordance with a voltage of the first data line when the first scanning line is selected;

a second scanning line disposed in an (i+1)-th row in the display region;

a second pixel circuit provided corresponding to the second scanning line and the first data line, and configured to be brought into an optical state in accordance with a voltage of the first data line when the second scanning line is selected; and a scanning line drive circuit configured to supply a scanning signal to the first scanning line and the second scanning line, wherein i and k are integers, in a period, in which the first scanning line and the second scanning line are selected, of a first subframe period of a frame period, a data signal of a voltage corresponding to the i-th row and the k-th column of first image data in the first subframe period is output, and in a period, in which the first scanning line and the second scanning line are selected, of a second subframe period of the frame period, a data signal of a voltage corresponding to the (i+1)-th row and the k-th column of second image data in the second subframe period is output;

wherein the scanning line drive circuit includes a first holding circuit holding information for setting each of the first scanning line and the second scanning line to a primary or a secondary, and when information for specifying selection of the scanning line set to the primary is supplied, supplies the primary scanning line with a scanning signal indicating that the primary scanning line is to be selected, and supplies the scanning line set to the secondary with a scanning signal indicating that the scanning line set to the secondary is to be selected; and wherein each of the first pixel circuit and the second pixel circuit includes a first transistor, a second transistor, a third transistor, a fourth transistor, and a display element, the first transistor includes a gate node, a source node, and a drain node, and causes a current in accordance with a voltage between the gate node and the source node to flow to the display element via the fourth transistor, the second transistor is provided between the first data line and the gate node of the first transistor, and brought into an on-state or an off-state in accordance with selection or non-selection of a scanning line, the third transistor is provided between the data line and the drain node of the first transistor, and the fourth transistor is provided between the drain node of the first transistor and the display element, in the first subframe period, there is a period in which the gate node and the drain node of the first transistor in the first pixel circuit are electrically coupled, there is not a period in which the gate node and the drain node of the first transistor in the second pixel circuit are electrically coupled, and in the second subframe period there is not a period in which the gate node and the drain node of the first transistor in the first pixel circuit are electrically coupled, and there is a period in which the gate node and the drain node of the first transistor in the second pixel circuit are electrically coupled.

2. The electro-optical device according to claim 1, wherein the fourth transistor of the first pixel circuit is controlled to be in the on-state by selection of a first light emission control line, the fourth transistor of the second pixel circuit is controlled to be in the on-state by selection of a second light emission control line, the scanning line drive circuit includes a second holding circuit holding information for setting each of the first light emission control line and the second light emission control line to the primary or the secondary, supplies a light emission control signal to the first light emission control line and the second light emission control line, and when information specifying selection of the light emission control line set to the primary is supplied, supplies the primary light emission control line with a light emission control signal indicating that the primary light emission control line is to be selected, and supplies the light emission control line set to the secondary with a light emission control signal indicating that the light emission control line set to the secondary is selected.

3. The electro-optical device according to claim 2, comprising:

a third pixel circuit provided corresponding to a third scanning line and the first data line; and a fourth pixel circuit provided corresponding to a fourth scanning line and the first data line, wherein the first scanning line to the fourth scanning line are arrayed in this order, in the first subframe period, the first scanning line and the third scanning line are set to the primary, in a period in which the third scanning line and the fourth scanning line are selected, a data signal of a voltage corresponding to an (i+2)-th row and the k-th column of the first image data is output, and in the second subframe period, the second scanning line and the fourth scanning line are set to the primary, and in a period in which the third scanning line and the fourth scanning line are selected, a data signal of a voltage corresponding to an (i+3)-th row and the k-th column of the second image data is output.

4. The electro-optical device according to claim 3, wherein a fourth transistor of the third pixel circuit is controlled to be in the on-state by selection of a third light emission control line, a fourth transistor of the fourth pixel circuit is controlled to be in the on-state by selection of a fourth light emission control line, and after one of the first light emission control line and the second light emission control line is set to the primary, and another is set to the secondary, one of the third light emission control line and the fourth light emission control line is set to the primary, and another is set to the secondary.

5. The electro-optical device according to claim 4, wherein the display region includes a first region and a second region separated in a direction along the first scanning line, the second region being located closer to a center than the first region, in the second region, a fifth pixel circuit provided corresponding to a fifth scanning line and the first data line, a sixth pixel circuit provided corresponding to a sixth scanning line and the first data line, a seventh pixel circuit provided corresponding to a seventh scanning line and the first data line, an eighth pixel circuit provided corresponding to an eighth scanning line and the first data line, a ninth pixel circuit provided corresponding to a ninth scanning line and the first data line, and a tenth pixel circuit provided corresponding to a tenth scanning line and the first data line, are included, the first scanning line to the tenth scanning line are arrayed in this order, in the first subframe period, the fifth scanning line, the sixth scanning line, the seventh scanning line, the ninth scanning line, and the tenth scanning line are set to the primary, and the eighth scanning line is set to the secondary of the seventh scanning line, and in the second subframe period, the fifth scanning line, the sixth scanning line, the eighth scanning line, the ninth scanning line, and the tenth scanning line are set to the primary, and the seventh scanning line is set to the secondary of the eighth scanning line.

6. The electro-optical device according to claim 5, comprising:

an eleventh pixel circuit provided corresponding to the first scanning line, and a second data line different from the first data line, wherein in the first subframe period, in a period in which the first scanning line is selected, a data signal of a voltage corresponding to the i-th row and the k-th column of the first image data is output to the second data line, and in the second subframe period, in a period in which the second scanning line is selected, a data signal of a voltage corresponding to the (i+1)-th row and the k-th column of the second image data is output to the second data line.

7. An electronic apparatus comprising the electro-optical device according to claim 1.

* * * * *